(12) United States Patent
Fujita et al.

(10) Patent No.: US 10,365,044 B2
(45) Date of Patent: Jul. 30, 2019

(54) HEAT EXCHANGER AND GAS TURBINE PLANT PROVIDED THEREWITH

(71) Applicant: MITSUBISHI HITACHI POWER SYSTEMS, LTD., Kanagawa (JP)

(72) Inventors: Issaku Fujita, Tokyo (JP); Taichi Nakamura, Tokyo (JP); Satoshi Hiraoka, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 73 days.

(21) Appl. No.: 14/767,051

(22) PCT Filed: Feb. 17, 2014

(86) PCT No.: PCT/JP2014/053675
§ 371 (c)(1),
(2) Date: Aug. 11, 2015

(87) PCT Pub. No.: WO2014/126249
PCT Pub. Date: Aug. 21, 2014

(65) Prior Publication Data
US 2016/0003551 A1 Jan. 7, 2016

(30) Foreign Application Priority Data
Feb. 18, 2013 (JP) ................. 2013-029472

(51) Int. Cl.
*F28D 7/06* (2006.01)
*F01K 23/10* (2006.01)
(Continued)

(52) U.S. Cl.
CPC ............. *F28D 7/06* (2013.01); *F01K 23/10* (2013.01); *F02C 6/18* (2013.01); *F02C 7/224* (2013.01);
(Continued)

(58) Field of Classification Search
CPC ...... F28D 7/1607; F28D 7/163; F28D 7/1653; F28D 7/1676; F28D 7/06; F01K 23/10;
(Continued)

(56) References Cited

U.S. PATENT DOCUMENTS 1,669,291 A * 5/1928 Dean .................. F22D 1/006
165/161
1,768,786 A * 7/1930 Potter ................. F28F 9/00
165/161
(Continued)

FOREIGN PATENT DOCUMENTS

CN 2596308 12/2003
JP 54-86772 6/1979
(Continued)

OTHER PUBLICATIONS

First Office Action dated Jul. 12, 2016 in corresponding Chinese Application No. 201480008159.6 (with partial English translation).
(Continued)

*Primary Examiner* — Steven M Sutherland
*Assistant Examiner* — Rene D Ford
(74) *Attorney, Agent, or Firm* — Wenderoth, Lind & Ponack, L.L.P.

(57) ABSTRACT

The heat exchanger is provided with a body, multiple heat transfer tubes (20) which are arranged inside of the body, and multiple support plates (30) which are arranged at intervals along the longitudinal direction of the heat transfer tubes (20) and in which multiple tube insertion through-holes (40) for inserting the multiple heat transfer tubes (20) are formed. Between two support plates (30) adjacent in the longitudinal direction among the plurality of support plates (30), the shapes of the tube insertion through-holes (40) for one heat transfer tube (20) are different.

10 Claims, 24 Drawing Sheets

(51) Int. Cl.
  *F28F 9/013* (2006.01)
  *F28F 9/22* (2006.01)
  *F28D 7/16* (2006.01)
  *F02C 7/224* (2006.01)
  *F02C 6/18* (2006.01)

(52) U.S. Cl.
  CPC ............ *F28D 7/1607* (2013.01); *F28F 9/013* (2013.01); *F28F 9/0131* (2013.01); *F28F 9/22* (2013.01); *Y02E 20/16* (2013.01)

(58) Field of Classification Search
  CPC .... F02C 7/224; F02C 7/08; F02C 7/14; F02C 7/141; F02C 7/143; F28F 9/0135; F28F 9/0075; F28F 2009/224; F28F 2009/226; Y02T 50/675; F22B 1/025
  USPC .................. 165/158, 160, 161, 162, 178
  See application file for complete search history.

(56) References Cited

U.S. PATENT DOCUMENTS

| | | | | | |
|---|---|---|---|---|---|
| 1,979,859 | A | * | 11/1934 | Brown | F28D 7/0041 122/367.1 |
| 3,566,961 | A | * | 3/1971 | Lorenz | B01J 8/062 165/104.31 |
| 3,841,271 | A | * | 10/1974 | Harris, Jr. | F22B 1/063 122/32 |
| 3,857,442 | A | * | 12/1974 | Sturiale | F28D 7/1669 165/134.1 |
| 4,089,369 | A | * | 5/1978 | Lipets | F28D 7/163 165/158 |
| 4,416,223 | A | * | 11/1983 | Hashizume | F22B 37/101 122/367.3 |
| 4,778,005 | A | * | 10/1988 | Smith | F28D 7/06 165/160 |
| 5,544,700 | A | * | 8/1996 | Shagoury | F02C 7/14 165/139 |
| 6,089,312 | A | * | 7/2000 | Biar | F28D 7/1653 165/115 |
| 6,889,751 | B1 | * | 5/2005 | Lukas | B60H 1/00492 165/10 |
| 7,131,489 | B2 | * | 11/2006 | Gohna | F28D 7/1607 165/160 |
| 2005/0161204 | A1 | * | 7/2005 | Johnston | F28D 7/16 165/162 |
| 2014/0165572 | A1 | * | 6/2014 | Pang | F02C 7/224 60/736 |

FOREIGN PATENT DOCUMENTS

| | | |
|---|---|---|
| JP | 56-80700 | 7/1981 |
| JP | 60-50376 | 4/1985 |
| JP | 61-115804 | 7/1986 |
| JP | 62-166296 | 7/1987 |
| JP | 62-252895 | 11/1987 |
| JP | 1-300195 | 12/1989 |
| JP | 2003-240453 | 8/2003 |
| JP | 2007-162627 | 6/2007 |
| JP | 2011-179781 | 9/2011 |
| JP | 2012-145284 | 8/2012 |
| JP | 2012-180774 | 9/2012 |
| JP | 2012180774 A * | 9/2012 |

OTHER PUBLICATIONS

International Search Report dated May 20, 2014 in corresponding International Application No. PCT/JP2014/053675.

Written Opinion of the International Searching Authority dated May 20, 2014 in corresponding International Application No. PCT/JP2014/053675.

Notice of Reasons for Rejection dated Aug. 9, 2016 in corresponding Japanese Application No. 2013-029472 (with English translation).

* cited by examiner

HEAT EXCHANGER AND GAS TURBINE PLANT PROVIDED THEREWITH

TECHNICAL FIELD

The present invention relates to a heat exchanger and a gas turbine plant provided therewith.

This application claims priority based on Japanese Patent Application No. 2013-029472 filed in Japan on Feb. 18, 2013, of which the contents are incorporated herein by reference.

BACKGROUND ART

In general, as a heat exchanger, a heat exchanger provided with a plurality of heat transfer tubes provided inside a body, and a plurality of heat transfer tube support apparatuses supporting the heat transfer tubes has been proposed (refer to Patent Document 1). In this heat exchanger, heat exchange is performed between an in-tube fluid flowing inside the heat transfer tubes, and an out-of-tube fluid flowing outside the heat transfer tubes in the opposite direction to the in-tube fluid.

In addition, an egg-crate turbulence promotion mechanism is provided in this heat exchanger in the heat transfer tube support apparatuses. Thus, since the laminar flow of the fluid is disturbed when the fluid flowing outside the heat transfer tubes flows in a portion between the heat transfer tubes and the egg-crate turbulence promotion mechanism, heat exchange is efficiently performed between the fluid flowing outside the heat transfer tubes and the fluid flowing inside the heat transfer tubes.

CITATION LIST

Patent Document

Patent Document 1: Japanese Unexamined Patent Application Publication No. S62-166296

SUMMARY OF INVENTION

Technical Problem

In this manner, since the heat exchange rate is only somewhat improved in the heat exchanger described in Patent Document 1 described above, it is desirable to improve the heat exchange rate to be even higher.

The present invention provides a heat exchanger which is able to efficiently perform heat exchange and a gas turbine plant provided therewith.

Solution to Problem (1) According to a first aspect of the present invention, a heat exchanger is provided with a body, a plurality of heat transfer tubes, and support plates. The plurality of heat transfer tubes are provided inside the body. The support plates are arranged in plural at intervals along the longitudinal direction of the heat transfer tubes. A plurality of tube insertion through-holes for inserting the plurality of heat transfer tubes are formed in the support plates. The shapes of the tube insertion through-holes for one heat transfer tube are different between two support plates adjacent in the longitudinal direction among the plurality of support plates.

According to the configuration described above, since the shapes of the tube insertion through-holes formed in the support plates for one heat transfer tube are different between adjacent support plates, the shapes of space portions formed between the tube insertion through-holes of the support plates and the heat transfer tubes are different between adjacent support plates. Due to this, when the fluid flowing outside the heat transfer tubes passes through the space portion, the laminar flow is disrupted according to the shape of the space portion. Thus, heat exchange is efficiently performed between the fluid flowing inside the heat transfer tubes and the fluid flowing outside the heat transfer tubes along the entire heat transfer tubes in the longitudinal direction.

(2) The heat exchanger of (1) described above is further provided with ducts provided on an outer peripheral side of a bundle of the plurality of heat transfer tubes, the ducts covering the plurality of heat transfer tubes, extending in the longitudinal direction, and being arranged at intervals with an inner peripheral surface of the body.

According to the configuration described above, heat exchange is performed between the fluid flowing inside the heat transfer tubes (referred to as the in-tube fluid) and the fluid flowing outside the heat transfer tubes (referred to as the out-of-tube fluid). Here, since the out-of-tube fluid flows inside the ducts, even when the out-of-tube fluid reaches a high temperature due to heat exchange, it is possible to suppress increases in the temperature of the fluid present between duct outer sections and the inner peripheral surface of the body. Thus, since the temperature of the body itself does not rise, it is possible to maintain the heat exchanger in a good state.

(3) The heat exchanger of (1) or (2) described above may be provided with fins on the outer peripheral surface of the heat transfer tubes, the fins protruding outward in the radial direction and extending in the longitudinal direction.

According to the configuration described above, since the heat transfer area during heat exchange is increased by providing the fins on the heat transfer tubes, heat exchange is efficiently performed.

(4) In the heat exchanger according to any one of (1) to (3) described above, the body may be provided with at least one of inlet header piping supplying an in-tube fluid inside the plurality of heat transfer tubes and outlet header piping discharging the heat-exchanged in-tube fluid from the heat transfer tubes.

According to the configuration described above, for example, in a case where the inlet header piping is provided, the in-tube fluid is supplied inside the heat transfer tubes via the inlet header piping, and heat-exchanged in-tube fluid is discharged from the heat transfer tubes. Here, heat exchangers generally have nozzles supplying the in-tube fluid inside the body and nozzles discharging heat-exchanged in-tube fluid from the body, both provided in the body. In such a heat exchanger, it is necessary to provide a wall partitioning a compartment on the side where the supply side nozzles are provided and a compartment on the side where the discharge side nozzles are provided. By contrast, in the heat exchanger with the configuration described above, it is possible to save the costs of the wall since it is possible to separate the in-tube fluid before and after heat exchange, without providing such a wall, by providing the inlet header piping. Here, in a case where the outlet header piping is provided, it is also possible to save the costs of the wall since it is possible to separate the in-tube fluid before and after heat exchange in the same manner as the case where the inlet header piping is provided.

(5) In the heat exchanger of (4) described above, the body may be provided with both of the inlet header piping and the outlet header piping.

According to the configuration described above, an in-tube fluid is supplied inside the heat transfer tubes via the inlet header piping, and the heat-exchanged in-tube fluid is discharged from the heat transfer tubes via the outlet header piping. Here, heat exchangers generally have a tube plate for supporting end sections of the heat transfer tubes, and are provided on the body with nozzles supplying an in-tube fluid and nozzles discharging the heat-exchanged in-tube fluid. In such a heat exchanger, since the thickness of the tube plate is determined according to the conditions such as the temperature, the pressure, the inner diameter, and the like of the body, it is necessary to increase the thickness of the tube plate depending on the conditions. By contrast, in the heat exchanger with the configuration described above, it is possible to save the costs of the tube plate since it is possible to separate the in-tube fluid before and after heat exchange, without such a tube plate, by providing the inlet header piping and the outlet header piping.

(6) According to a second aspect of the present invention, a gas turbine plant is provided with the heat exchanger according to any one of (1) to (5) described above, an air compressor, a combustor, and a turbine. The air compressor generates compressed air by compressing ambient air. The combustor generates combustion gas by combusting fuel in compressed air. The turbine is driven by high-temperature and high-pressure combustion gas. The fuel to be supplied to the combustor is supplied to the heat exchanger as a fluid to be heated.

According to the configuration described above, it is possible to set the fuel, which is a fluid to be heated, to a high-temperature state by heat exchange. Thus, since the high-temperature fuel is supplied to the combustor, it is possible for the combustor to efficiently generate high-temperature gas.

(7) The gas turbine plant of (6) described above may be further provided with a heat recovery steam generator generating steam by carrying out heat exchange between combustion gas discharged from the turbine and water. An in-tube fluid flows inside the heat transfer tubes. An out-of-tube fluid flows outside the heat transfer tubes and inside the body. The in-tube fluid is a fluid derived from the heat recovery steam generator. The out-of-tube fluid, which is the fuel to be supplied to the heat exchanger, is heat-exchanged with the in-tube fluid, increased in temperature, and supplied to the combustor.

According to the configuration described above, it is possible for the heat exchanger to set the fuel, which is the out-of-tube fluid, to a high-temperature state by carrying out heat exchange between the in-tube fluid and the out-of-tube fluid. Thus, since the high-temperature fuel is supplied to the combustor, it is possible for the combustor to efficiently generate high-temperature combustion gas.

(8) The gas turbine plant according to (6) described above may be further provided with a heat recovery steam generator generating steam by carrying out heat exchange between the combustion gas discharged from the turbine and water. An in-tube fluid flows inside the heat transfer tubes. An out-of-tube fluid flows outside the heat transfer tubes and inside the body. The out-of-tube fluid is a fluid derived from the heat recovery steam generator. The in-tube fluid, which is the fuel to be supplied to the heat exchanger, may be heat-exchanged with the out-of-tube fluid, increased in temperature, and supplied to the combustor.

According to the configuration described above, it is possible for the heat exchanger to set the fuel, which is the in-tube fluid, to a high-temperature state by carrying out heat exchange between the in-tube fluid and the out-of-tube fluid. Thus, since the high-temperature fuel is supplied to the combustor, it is possible for the combustor to efficiently generate high-temperature combustion gas.

(9) According to a third aspect of the present invention, a gas turbine plant is provided with the heat exchanger according to any one of (1) to (5) described above, an air compressor, a combustor, and a turbine. The air compressor generates compressed air by compressing ambient air. The combustor generates combustion gas by carrying out combustion in the compressed air. The turbine is driven by high-temperature and high-pressure combustion gas. A fluid for cooling to be supplied to the turbine is supplied to the heat exchanger as a fluid to be cooled.

According to the configuration described above, it is possible to set the fluid for cooling, which is a fluid to be cooled, to a low-temperature state by carrying out heat exchange. Thus, since the low-temperature fluid for cooling is supplied to the turbine, it is possible to efficiently cool the turbine interior.

(10) The gas turbine plant of (9) described above may be further provided with a heat recovery steam generator, a steam turbine, and a condenser. The heat recovery steam generator generates steam by carrying out heat exchange between the combustion gas discharged from the turbine and water. The steam turbine is driven by steam generated by the heat recovery steam generator. The condenser changes the steam which drove the steam turbine back to water. An in-tube fluid flows inside the heat transfer tubes. An out-of-tube fluid flows outside the heat transfer tubes and inside the body. The in-tube fluid is a fluid derived from the condenser. The out-of-tube fluid, which is extracted air extracted from the air compressor, is heat-exchanged with the in-tube fluid, decreased in temperature, and supplied to the turbine.

According to the configuration described above, it is possible for the heat exchanger to set the extracted air, which is the out-of-tube fluid, to a low-temperature state by carrying out heat exchange between the in-tube fluid and the out-of-tube fluid. Thus, since the low-temperature extracted air is supplied to the turbine, it is possible to efficiently cool the turbine interior.

(11) The gas turbine plant of (9) described above may be further provided with a heat recovery steam generator, a steam turbine, and a condenser. The heat recovery steam generator generates steam by carrying out heat exchange between the combustion gas discharged from the turbine and water. The steam turbine is driven by steam generated by the heat recovery steam generator. The condenser changes the steam which drove the steam turbine back to water. An in-tube fluid flows inside the heat transfer tubes. An out-of-tube fluid flows outside the heat transfer tubes and inside the body. The out-of-tube fluid is a fluid derived from the condenser. The in-tube fluid, which is extracted air extracted from the air compressor, is heat-exchanged with the out-of-tube fluid, decreased in temperature, and supplied to the turbine.

According to the configuration described above, it is possible for the heat exchanger to set the extracted air, which is the in-tube fluid, to a low-temperature state by carrying out heat exchange between the in-tube fluid and the out-of-tube fluid. Thus, since the low-temperature extracted air is supplied to the turbine, it is possible to efficiently cool the turbine interior.

Advantageous Effects of Invention

According to the heat exchanger and the gas turbine plant provided therewith described above, it is possible to efficiently carry out heat exchange.

DESCRIPTION OF EMBODIMENTS

First Embodiment

Below, description will be given of a heat exchanger according to the first embodiment of the present invention with reference to the drawings.

Figure 1:
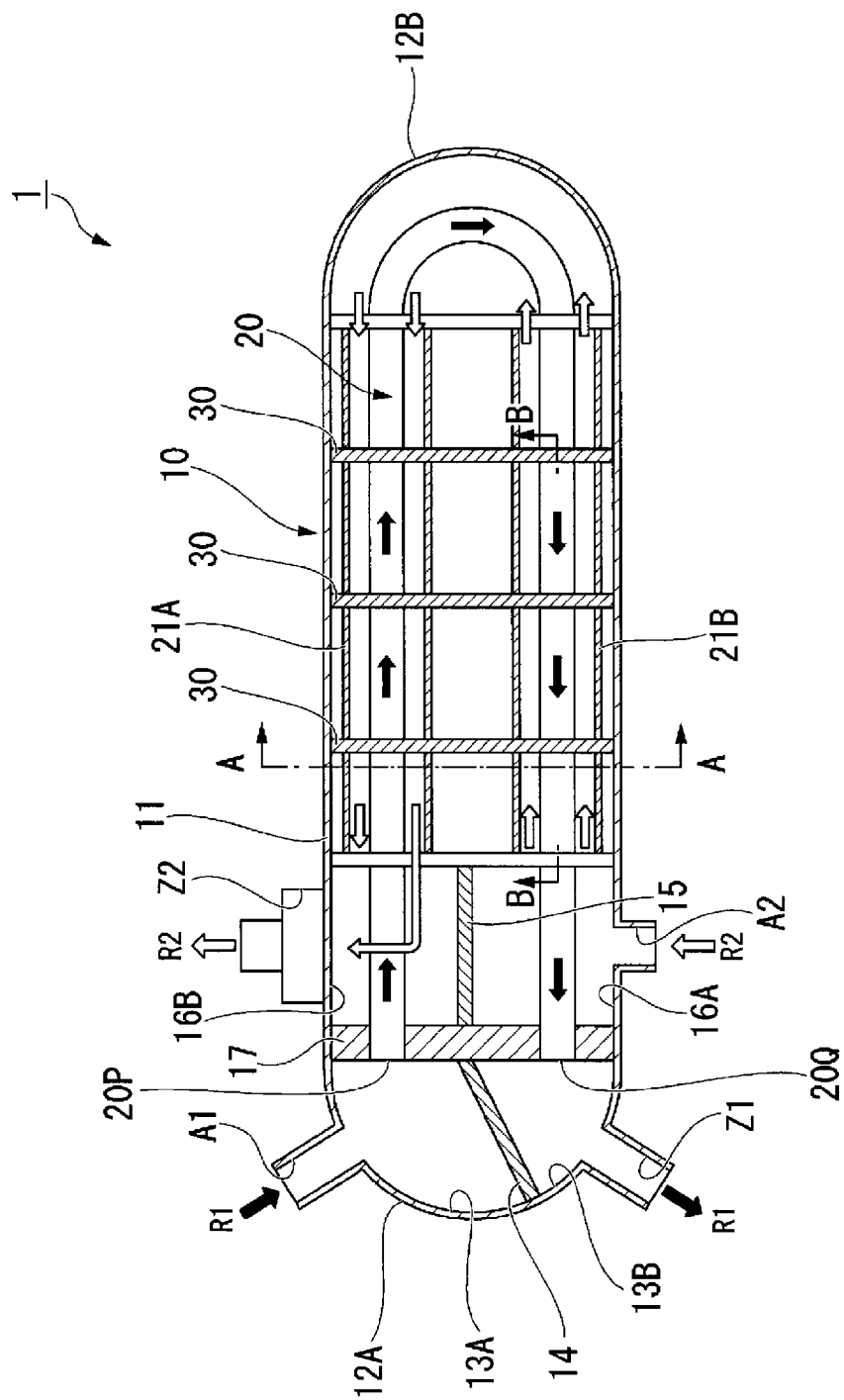
FIG. 1 is an overall configuration diagram illustrating the configuration of a heat exchanger according to a first embodiment of the present invention.

As illustrated in FIG. 1, a heat exchanger 1 is provided with a body 10, a plurality of heat transfer tubes 20, and support plates 30. The plurality of heat transfer tubes 20 are arranged inside of the body 10. The support plates 30 support the plurality of heat transfer tubes 20. An in-tube fluid R1 flows inside the heat transfer tubes 20. An out-of-tube fluid R2 flows outside the heat transfer tubes 20. In the heat exchanger 1, the temperature of the out-of-tube fluid R2 is increased by heat exchange between the in-tube fluid R1 and the out-of-tube fluid R2.

The body 10 is a hollow container. The body 10 has a cylindrical shell 11, and a pair of shell lids 12A and 12B covering both ends of the shell 11. A tube plate 17 is provided between the shell 11 and the shell lid 12A. The heat transfer tubes 20 to be described later are fixed to the tube plate 17.

A first inlet nozzle A1 is provided on an upper section of the shell lid 12A of the body 10. The first inlet nozzle A1 supplies the in-tube fluid R1 to the interior of the body 10. In addition, a first outlet nozzle Z1 is provided at a lower section of the shell lid 12A of the body 10. The first outlet nozzle Z1 discharges the in-tube fluid R1 to the outside of the body 10.

The in-tube fluid R1 supplied from the first inlet nozzle A1 passes through a compartment 13A. The in-tube fluid R1 to be discharged from the first outlet nozzle Z1 passes through a compartment 13B. In the shell lid 12A, the compartment 13A and the compartment 13B are partitioned by a first partition wall 14.

A second inlet nozzle A2 is provided at a lower section of the shell 11 of the body 10. The second inlet nozzle A2 supplies the out-of-tube fluid R2 to the interior of the body 10. In addition, a second outlet nozzle Z2 is provided at an upper section of the shell 11 of the body 10. The second outlet nozzle Z2 discharges the out-of-tube fluid R2 to the outside of the body 10.

The out-of-tube fluid R2 supplied from the second inlet nozzle A2 passes through a compartment 16A. The out-of-tube fluid R2 to be discharged from the second outlet nozzle Z2 passes through a compartment 16B. In the shell 11, the compartment 16A and the compartment 16B are partitioned by a second partition wall 15.

Portions of the heat transfer tubes 20 arranged on the shell lid 12A side of the body 10 are fixed to the tube plate 17. Portions of the heat transfer tubes 20 arranged on the shell lid 12B side are formed in a curve. In other words, the heat transfer tubes 20 extend in a straight line from an inlet section 20P of the heat transfer tubes 20 fixed to the tube plate 17 toward the shell lid 12B of the body 10. Following on, the heat transfer tubes 20 are curved in a U shape on the shell lid 12b side. Next, the heat transfer tubes 20 extend again in a straight line toward the shell lid 12A. Subsequently, an outlet section 20Q in the heat transfer tubes 20 is fixed to the tube plate 17. Thus, in the heat transfer tubes illustrated in FIG. 1, there is an outgoing path on the upper side of the diagram and a return path on the lower side of the diagram. The in-tube fluid R1 flows in the interior of the heat transfer tubes 20.

Figure 2:
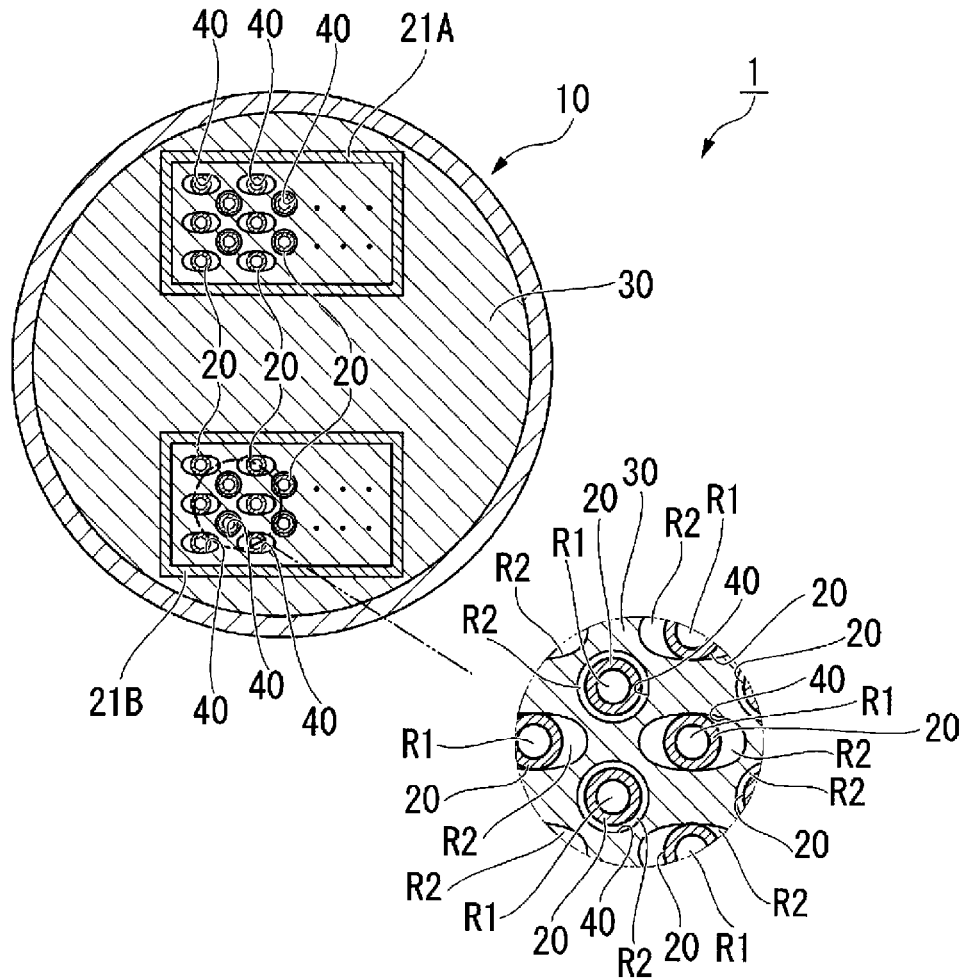
FIG. 2 is a cross-sectional view along A-A in FIG. 1.

As illustrated in FIG. 2, the plurality of heat transfer tubes 20 are arranged in a staggered manner when seen in a cross-section.

In addition, ducts 21A and 21B are provided on the outer periphery of the bundle of the plurality of heat transfer tubes 20. The ducts 21A and 21B extend along the longitudinal direction of the heat transfer tubes 20. The ducts 21A and 21B are arranged at intervals with the inner peripheral surface of the body 10 and are separated from each other in the vertical direction.

The duct 21A extends in the direction in which the in-tube fluid R1 supplied inside the heat transfer tubes 20 moves away from the tube plate 17. The duct 21B extends in the direction in which the in-tube fluid R1 flowing inside the heat transfer tubes 20 moves closer to the tube plate 17. The out-of-tube fluid R2 flows inside the ducts 21A and 21B and outside the plurality of heat transfer tubes 20.

Figure 3:
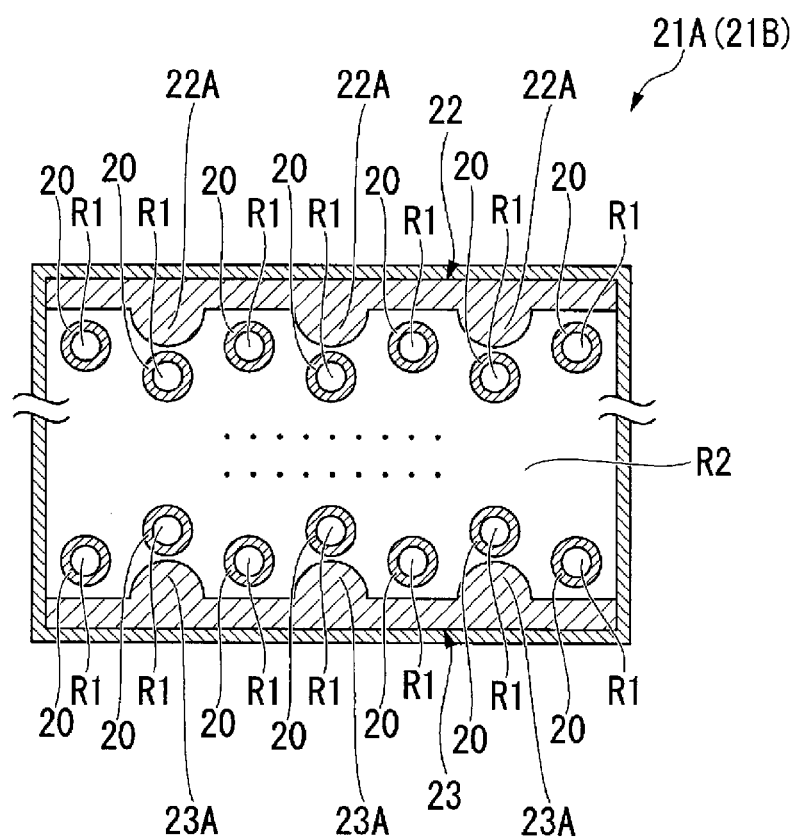
FIG. 3 is a cross-sectional view of a duct portion in the heat exchanger according to the first embodiment of the present invention.

As illustrated in FIG. 3, an upper plate 22 extending downward from the respective upper sections is provided in the interiors of the ducts 21A and 21B. A lower plate 23 extending upward from the lower section is provided in the interiors of the ducts 21A and 21B. Convex sections 22A and 23A are provided in portions where the heat transfer tubes 20 are not arranged at the end sections of the upper plate 22 and the lower plate 23. In other words, the convex sections 22A are arranged between the plurality of heat transfer tubes 20 of the uppermost section. The convex sections 23A are arranged between the plurality of heat transfer tubes 20 of the lowermost section.

The upper plate 22 and lower plate 23 prevent the out-of-tube fluid R2 which flows inside the ducts 21A and 21B from flowing on the upper side or the lower side away from the bundle of the plurality of heat transfer tubes 20, and enable the out-of-tube fluid R2 to flow through a portion close to the heat transfer tubes 20. Thus, efficient heat exchange is possible.

As illustrated in FIG. 1 and FIG. 2, the support plate 30 has a shape corresponding to the inner surface of the body 10. A plurality of support plates 30 are arranged at intervals along the longitudinal direction of the heat transfer tubes 20. A plurality of tube insertion through-holes 40 into which the plurality of heat transfer tubes 20 are inserted are formed in the support plates 30.

Figure 4A:
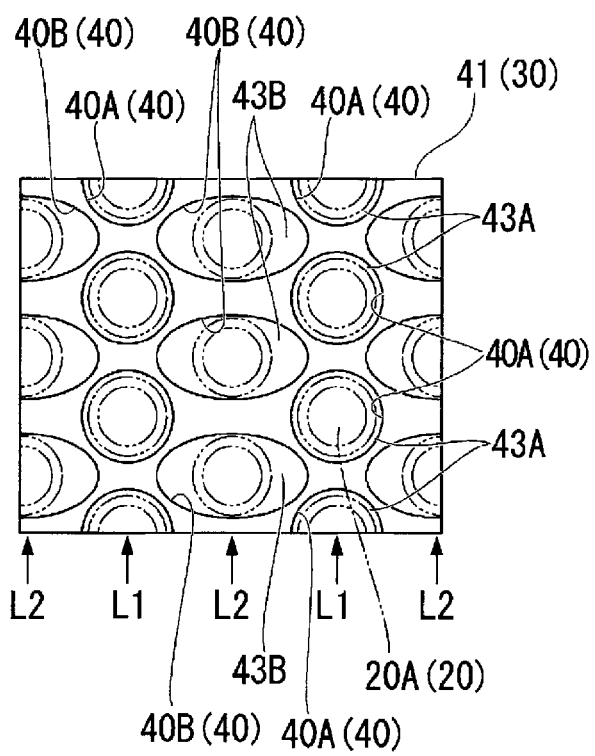
FIG. 4A is a cross-sectional view of one support plate portion constituting the heat exchanger according to the first embodiment of the present invention.
Figure 4B:
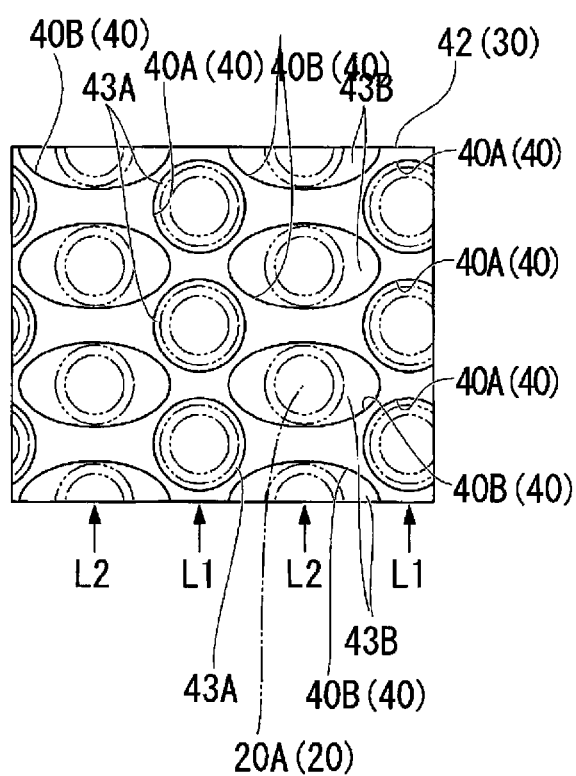
FIG. 4B is a cross-sectional view of a support plate portion adjacent to the one support plate constituting the heat exchanger according to the first embodiment of the present invention.

FIG. 4A is a cross-sectional enlarged view of one support plate 30 (hereinafter, referred to as a first support plate 41) out of the plurality of support plates 30. FIG. 4B is a cross-sectional enlarged view of a second support plate 42 arranged to be adjacent to the first support plate 41 on the downstream side of the out-of-tube fluid R2.

As illustrated in FIG. 4A, a plurality of circular holes 40A which are openings of a substantially circular shape are bored at intervals in the vertical direction in the first support plate 41. The interiors of the circular holes 40A are set as the tube insertion through-holes 40. A row (hereinafter, referred to as an oval hole row L2) next to the row (hereinafter, referred to as a circular hole row L1) where the plurality of circular holes 40A are arranged is configured by a plurality of oval holes 40B, of which the opening is a substantially oblong elliptical shape, being bored as the tube insertion through-holes 40 at intervals in the vertical direction and at positions shifted with respect to the circular hole row L1 in the vertical direction. In this manner, the circular hole row L1 and the oval hole row L2 are alternately arranged in the horizontal direction.

Also, the circular hole row L1 and the oval hole row L2 are alternately arranged in the second support plate 42 in the same manner as in the first support plate 41. However, the second support plate 42 is arranged to be shifted by one row L in the horizontal direction with respect to the first support plate 41.

As illustrated in FIG. 4A and FIG. 4B, the shapes of the tube insertion through-holes 40 in the first support plate 41 and the second support plate 42 are configured to be different from each other for one heat transfer tube 20A out of the plurality of heat transfer tubes 20.

In the present embodiment, the heat transfer tubes 20 inserted into the circular holes 40A constituting the circular hole row L1 in the first support plate 41 are inserted into the oval holes 40B constituting the oval hole row L2 in the second support plate 42.

On the other hand, the heat transfer tubes 20 inserted into the oval holes 40B constituting the oval hole row L2 in the first support plate 41 are configured to be inserted into the circular holes 40A constituting the circular hole row L1 in the second support plate 42.

As illustrated in FIG. 4A, FIG. 4B, FIG. 5A, and FIG. 5B, ring-shaped spaces 43A are formed between the circular holes 40A and the heat transfer tubes 20 inserted in the circular holes 40A. The ring-shaped spaces 43A are formed with substantially the same width along the entire circumference.

On the other hand, in the oval holes 40B, the outer peripheral surface of the inserted heat transfer tubes 20 and the inner peripheral surface of the oval holes 40B come into contact at the upper and lower portions. Thus, spaces 43B and 43B are respectively formed at the sides of the heat transfer tubes 20. In addition, by the outer peripheral surface of the heat transfer tubes 20 coming into contact with the inner peripheral surface of the oval holes 40B, the heat transfer tubes 20 are supported by the support plates 40.

Figure 5A:
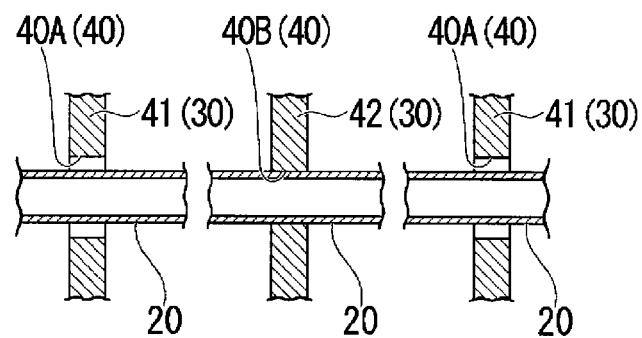
FIG. 5A is a cross-sectional view along B-B in FIG. 1.
Figure 5B:
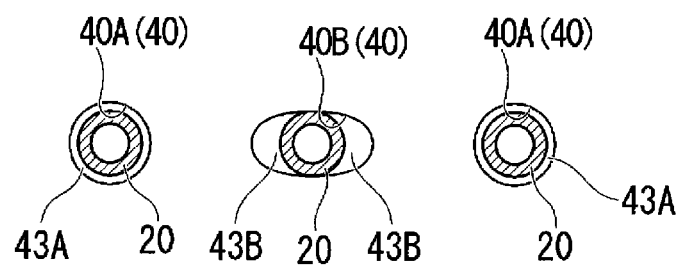
FIG. 5B is a longitudinal cross-sectional view around heat transfer tubes at the position illustrated in FIG. 5A.

As illustrated in FIG. 5A and FIG. 5B, the first support plate 41 and the second support plate 42 configured in this manner are alternately arranged along the longitudinal direction of the heat transfer tubes 20.

Next, description will be given of the operation of the heat exchanger 1 configured as described above.

The in-tube fluid R1 flows in the interior of the plurality of heat transfer tubes 20 after flowing in from the first inlet nozzle A1 and passing through the compartment 13A. Meanwhile, the out-of-tube fluid R2 flows inside the ducts 21B and 21A and outside of each of the heat transfer tubes 20 after flowing in from the second inlet nozzle A2 and passing through the compartment 16A.

The direction in which the in-tube fluid R1 flows and the direction in which the out-of-tube fluid R2 flows are opposite directions. It is possible for the in-tube fluid R1 and the out-of-tube fluid R2 to exchange heat through the tube walls of the heat transfer tubes 20.

Here, when the out-of-tube fluid R2 passes between the outer peripheral surface of the heat transfer tubes 20 and the tube insertion through-holes 40 formed in the support plates 30, a flow is formed as a result of the laminar flow formed along the longitudinal direction of the heat transfer tubes 20 being disrupted according to the shapes of the ring-shaped space 43A and the space 43B.

That is, in the first support plate 41, when the out-of-tube fluid R2 passes between the outer peripheral surface of one heat transfer tube 20A and the circular hole 40A, a flow is formed as a result of the laminar flow formed along the longitudinal direction of the one heat transfer tube 20A being disrupted according to the shape of the ring-shaped space 43A.

Next, in the second support plate 42, when the out-of-tube fluid R2 passes between the outer peripheral surface of the one heat transfer tube 20A and the oval hole 40B, a new flow is formed as a result of the flow described above being disrupted again according to the shape of the space 43B.

In this manner, every time the out-of-tube fluid R2 passes through between the tube insertion through-holes 40 formed in the support plate 30 and the outer peripheral surface of the heat transfer tubes 20, since a stirring flow is generated and temperature unevenness is suppressed due to the laminar flow being disrupted according to the shapes of the ring-shaped space 43A and the space 43B, it is possible to efficiently carry out heat exchange.

Due to this heat exchange, the temperature of the out-of-tube fluid R2 is increased and the temperature of the in-tube fluid R1 is decreased, and the out-of-tube fluid R2 and the in-tube fluid R1 are discharged from the second outlet nozzle Z2 and the first outlet nozzle Z1, respectively.

In the heat exchanger 1 configured as described above, the shapes of the tube insertion through-holes 40 formed in the support plates 30 with respect to one heat transfer tube 20A are different between adjacent support plates 30. Accordingly, the shapes of the ring-shaped space 43A and the space 43B formed between the tube insertion through-holes 40 of the support plates 30 and the heat transfer tubes 20 are different between adjacent support plates 30. Thus, when the out-of-tube fluid R2 passes through the ring-shaped space 43A and the space 43B, since a stirring flow is generated and temperature unevenness is suppressed due to the laminar flow being disrupted according to the shapes of the ring-shaped space 43A and space 43B, it is possible to efficiently perform heat exchange between the in-tube fluid R1 and the out-of-tube fluid R2 along the entire the heat transfer tubes 20 in the longitudinal direction.

In addition, since the out-of-tube fluid R2 flows inside the ducts 21A and 21B, even when the out-of-tube fluid R2 reaches a high temperature due to heat exchange, it is possible to suppress increases in the temperature of the fluid which is present between the outer sections of the ducts 21A and 21B and the inner peripheral surface of the body 10. Thus, since the temperature of the body 10 itself does not increase, it is possible to maintain the heat exchanger 1 in a good state.

In addition, for example, in a case where the in-tube fluid R1 leaks from the heat transfer tubes 20, the in-tube fluid R1 is made to drip onto a lower section of the body 10 by suppressing the flow rate of the out-of-tube fluid R2. Thus, it is possible to prevent the leaked in-tube fluid R1 from attaching to a device or the like provided on the second outlet nozzle Z2 side.

In addition, since the out-of-tube fluid R2 flows inside the ducts 21A and 21B, the flow along the longitudinal direction of the heat transfer tubes 20 becomes the main flow and it is possible to secure a large contact area with the heat transfer tubes 20. Thus, it is possible to efficiently carry out heat exchange between the out-of-tube fluid R2 and the in-tube fluid R1.

Second Embodiment

Figure 6A:
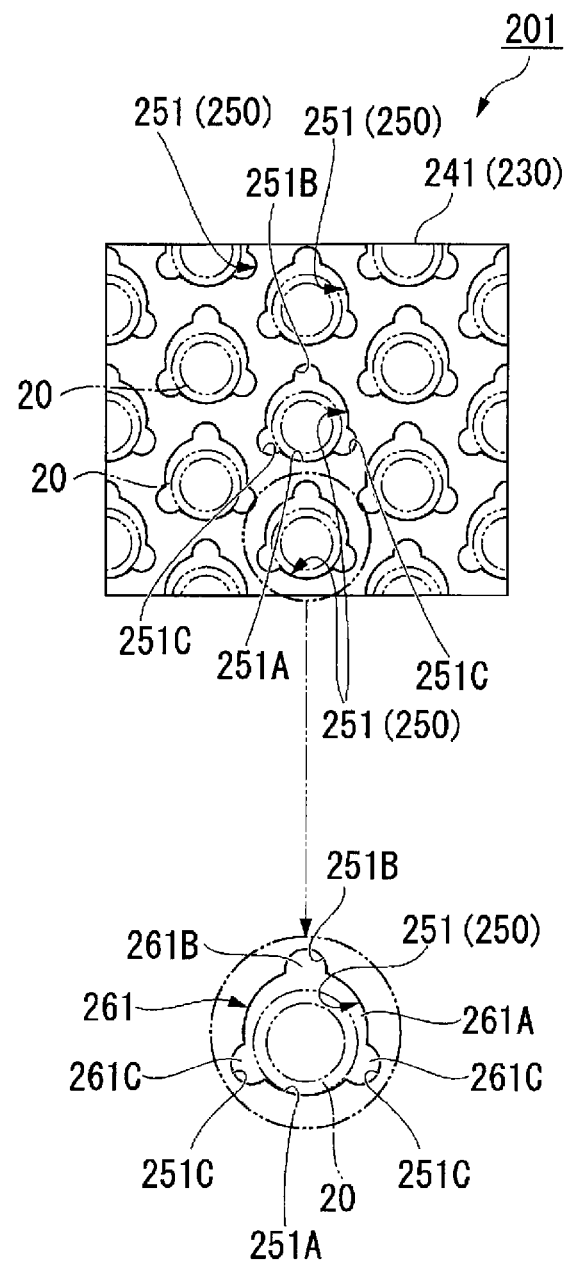
FIG. 6A is a cross-sectional view of one support plate portion constituting a heat exchanger according to a second embodiment of the present invention.
Figure 6B:
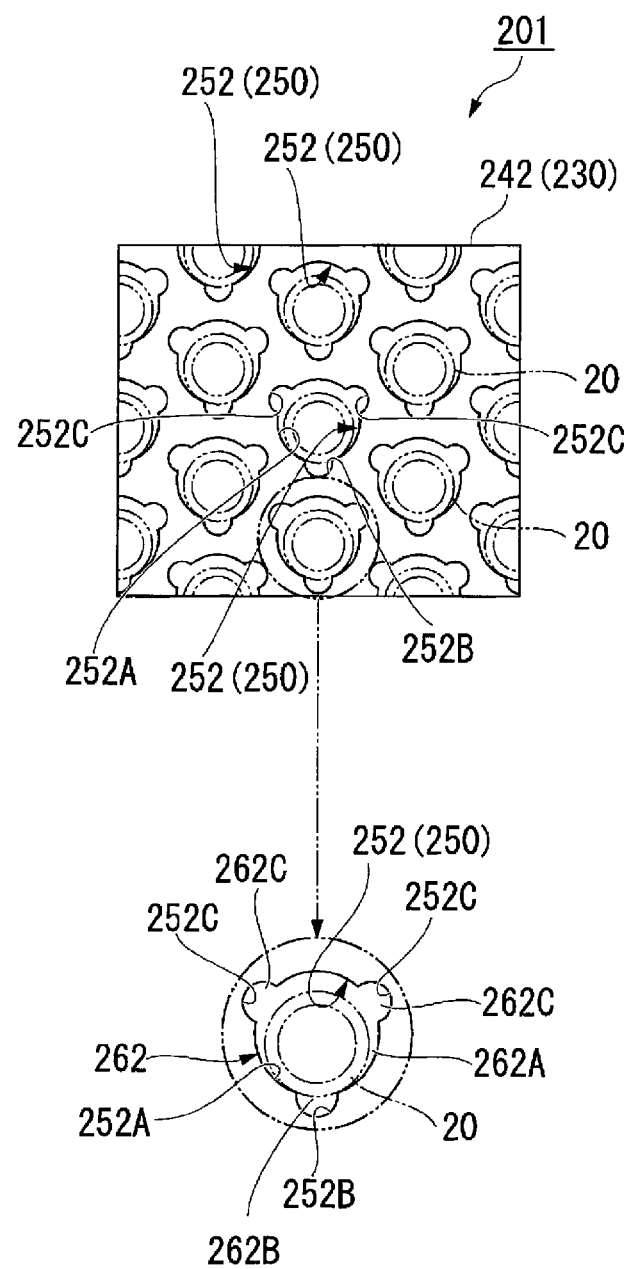
FIG. 6B is a cross-sectional view of a support plate portion adjacent to the one support plate constituting the heat exchanger according to the second embodiment of the present invention.

Below, description will be given of a heat exchanger 201 according to the second embodiment of the present invention using FIG. 6A and FIG. 6B.

In this embodiment, the same reference numerals are given to the same members as the members used in the embodiment described above, and description thereof will be omitted.

In the heat exchanger 201 according to the present embodiment, the configuration of the support plates 30 provided in the heat exchanger 1 according to the first embodiment described above is changed, and the configuration is in other respects the same as that of the heat exchanger 1 according to the first embodiment.

A plurality of first holes 251 are bored in a first support plate 241 constituting support plates 230 according to the present embodiment at intervals in the vertical direction as tube insertion through-holes 250. The next row in the horizontal direction to the one row where the first holes 251 are arrayed is configured by boring the plurality of first holes 251 so as to be spaced in the vertical direction at positions shifted in the vertical direction with respect to the one row. In other words, the first holes 251 are bored in a staggered manner in the first support plate 241.

The first holes 251 are formed by a circular hole section 251A with a center of a substantially circular shape, an upper hole section 251B formed so as to protrude upward from the upper end of the circular hole section 251A, and a pair of lower hole sections 251C formed so as to protrude downward obliquely from a lower section of the circular hole section 251A.

On the other hand, a plurality of second holes 252 which are inverted to be upside down with regard to the first holes 251 of the first support plate 241 are bored in a second support plate 242. The next row in the horizontal direction to the one row where the second holes 252 are arrayed is configured by boring the plurality of second holes 252 so as to be spaced in the vertical direction at positions shifted in the vertical direction with respect to the one row. In other words, second holes 252 are bored in a staggered manner in the second support plate 242.

The second holes 252 are formed by a circular hole section 252A with a center of a substantially circular shape, a lower hole section 252B formed so as to protrude downward from the lower end of the circular hole section 252A, and a pair of upper hole sections 252C formed so as to protrude upward from an upper section of the circular hole section 252A.

The first support plate 241 and the second support plate 242 configured as described above are alternately arranged along the longitudinal direction of the heat transfer tubes 20.

In this manner, the shapes of the tube insertion through-holes 250 in the first support plate 241 and the second support plate 242 are configured to be different from each other with respect to one heat transfer tube 20A (20).

Here, in the first support plate 241, the inner peripheral surface of the first holes 251 and the outer peripheral surface of the heat transfer tubes 20 come into contact at the lower sections. A first space 261 is formed along the outer peripheral surface other than at a lower section of the heat transfer tubes 20 in the first support plate 241. The space 261 is formed by an outer edge section 261A formed along the heat transfer tube 20, a space section 261B corresponding to the upper hole section 251B formed on an upper section of the outer edge section 261A, and space sections 261C corresponding to the lower hole sections 251C formed on a lower section of the outer edge section 261A.

On the other hand, in the second support plate 242, the inner peripheral surface of the second holes 252 and the outer peripheral surface of the heat transfer tubes 20 come into contact at the lower sections. Second spaces 262 are formed along the outer peripheral surface of the heat transfer tubes 20 in the second support plate 242. The second space 262 is formed by an outer edge section 262A formed along the heat transfer tube 20, a space section 262B corresponding to the lower hole section 252B formed in a lower section of the outer edge section 262A, and space sections 262C corresponding to the upper hole sections 252C formed in an upper section of the outer edge section 262A.

In the heat exchanger 201 configured in this manner, the tube insertion through-holes 250 formed in the support plates 230 with respect to one heat transfer tube 20 are the first holes 251 in the first support plates 241 and the second holes 252 in the second support plates 242. Thus, since the shapes of the tube insertion through-holes 250 are different between adjacent support plates 230, the shapes of the first space 261 and the second space 262 formed between the tube insertion through-holes 250 of the support plates 230 and the heat transfer tubes 20 are different between the adjacent support plates 230. Thus, when the out-of-tube fluid R2 passes through the first space 261 and the second space 262, since a stirring flow is generated and temperature unevenness is suppressed due to the laminar flow being disrupted according to the shapes of the first space 261 and the second space 262, it is possible to efficiently perform heat exchange between the in-tube fluid R1 and the out-of-tube fluid R2 along the entire heat transfer tubes 20 in the longitudinal direction.

Third Embodiment

Figure 7A:
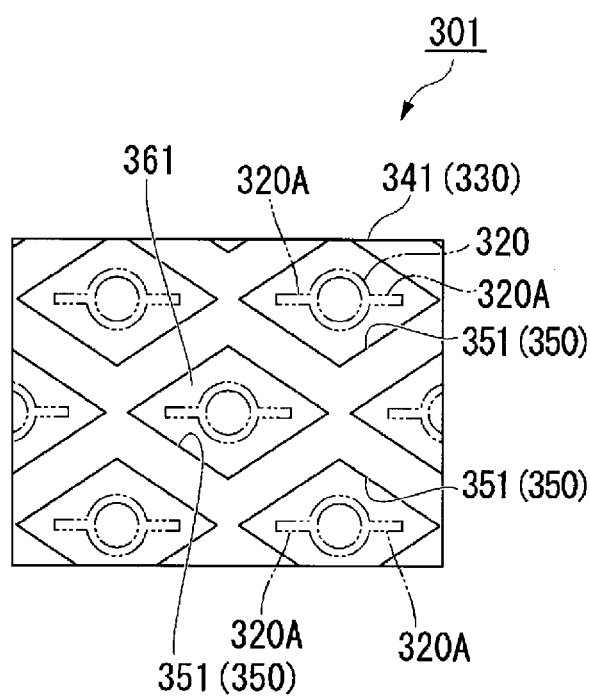
FIG. 7A is a cross-sectional view of one support plate portion constituting a heat exchanger according to a third embodiment of the present invention.
Figure 7B:
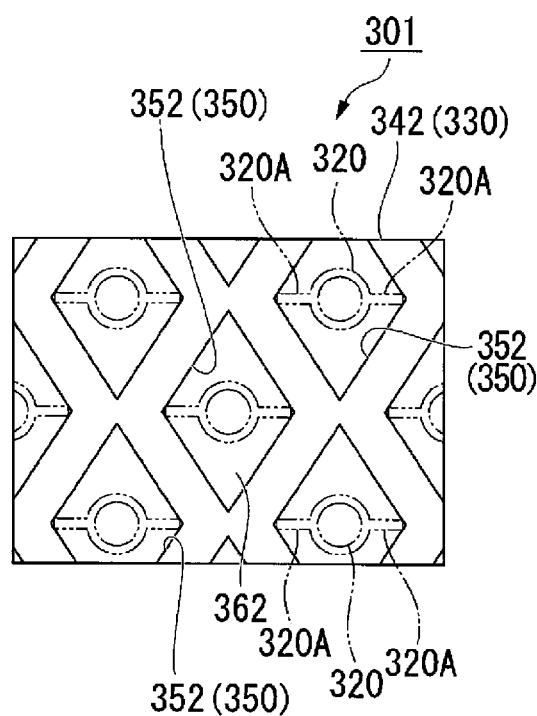
FIG. 7B is a cross-sectional view of a support plate portion adjacent to the one support plate constituting the heat exchanger according to the third embodiment of the present invention.

Below, description will be given of a heat exchanger 301 according to the third embodiment of the present invention using FIG. 7A and FIG. 7B.

In this embodiment, the same reference numerals are given to the same members as the members used in the embodiments described above, and description thereof will be omitted.

In the heat exchanger 301 according to the present embodiment, the configuration of the heat transfer tubes 20 and the support plates 30 provided in the heat exchanger 1 according to the first embodiment described above is changed, and the configuration is in other respects the same as that of the heat exchanger 1 according to the first embodiment.

Fins 320A protruding outward in the radial direction and extending in the longitudinal direction are provided on the outer peripheral surface of heat transfer tubes 320. The fins 320A are provided in pairs on both sides in the horizontal direction of the heat transfer tubes 320 when seen in a cross-section.

A plurality of first holes 351 are bored at intervals in the vertical direction as tube insertion through-holes 350 in a first support plate 341 constituting support plates 330 according to the present embodiment. The next row in the horizontal direction to the one row where the first holes 351 are arrayed is configured by boring the plurality of first holes 351 so as to be spaced in the vertical direction at positions shifted in the vertical direction with respect to the one row. In other words, the first holes 351 are bored in a staggered manner in the first support plate 341.

The first holes 351 are formed in a substantially diamond shape and the longer diagonal line of the pair of diagonal lines is arranged along the horizontal direction.

On the other hand, second holes 352 rotated 90 degrees from the first holes 351 of the first support plate 341 are formed in a second support plate 342. In the next row in the horizontal direction to the one row where the second holes 352 are arrayed, the plurality of second holes 352 are bored so as to be spaced in the vertical direction at positions shifted in the vertical direction with respect to the one row. In other words, the second holes 352 are bored in a staggered manner in the second support plate 342.

The second holes 352 are formed in a substantially diamond shape and the longer diagonal line of the pair of diagonal lines is arranged along the vertical direction.

The first support plate 341 and the second support plate 342 configured in this manner are alternately arranged along the longitudinal direction of the heat transfer tubes 320.

Thus, the shapes of the tube insertion through-holes 350 in the first support plate 341 and the second support plate 342 are configured to be different from each other with respect to one heat transfer tube 320.

Here, in the first support plate 341, first spaces 361 are formed between the first holes 351 and the outer peripheral surfaces of the heat transfer tubes 320. On the other hand, in the second support plate 342, second spaces 362 are formed between the second holes 352 and the outer peripheral surfaces of the heat transfer tubes 320.

In the heat exchanger 301 configured in this manner, the tube insertion through-holes 350 formed in the support plates 330 with respect to one heat transfer tube 320 are the first holes 351 in the first support plates 341 and the second holes 352 in the second support plates 342. Accordingly, since the shapes of the tube insertion through-holes 350 are different between adjacent support plates 330, the shapes of the first spaces 361 and the second spaces 362 formed between the tube insertion through-holes 350 of the support plates 330 and the heat transfer tubes 320 are different between adjacent support plates 330. Thus, when the out-of-tube fluid R2 passes through the first space 361 and the second space 362, since a stirring flow is generated and temperature unevenness is suppressed due to the laminar flow being disrupted according to the shapes of the first spaces 361 and the second spaces 362, heat exchange is efficiently performed between the in-tube fluid R1 and the out-of-tube fluid R2 along the entire heat transfer tubes 320 in the longitudinal direction.

In addition, since the heat transfer area at the time of heat exchange is increased by providing the fins on the heat transfer tubes 320, heat exchange is efficiently performed.

Modification of Third Embodiment

Figure 8A:
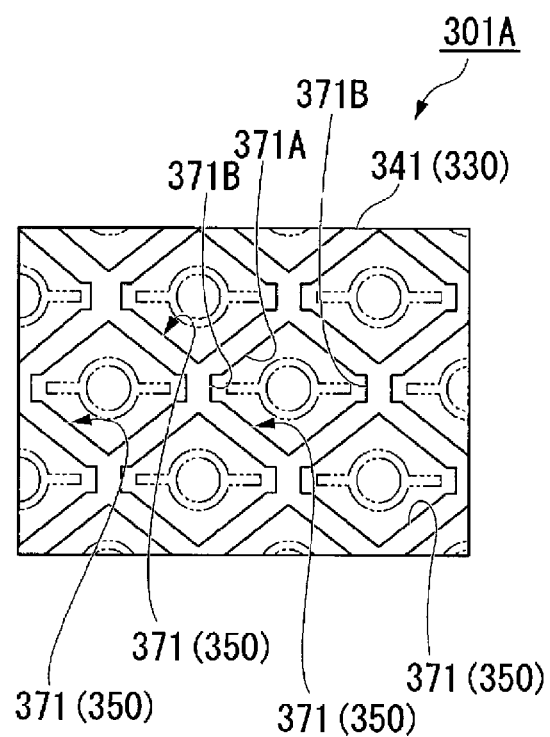
FIG. 8A is a cross-sectional view of one support plate portion constituting a heat exchanger according to a modification of the third embodiment of the present invention.
Figure 8B:
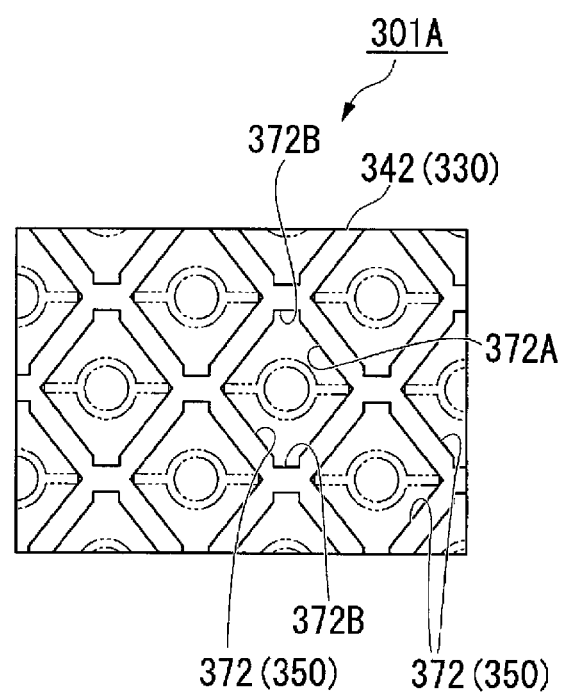
FIG. 8B is a cross-sectional view of a support plate portion adjacent to the one support plate constituting the heat exchanger according to the modification of the third embodiment of the present invention.

As illustrated in FIG. 8A and FIG. 8B, first holes 371 and second holes 372 corresponding to the cross-sectional shape of the fins 320A of the heat transfer tubes 320 are bored in the support plates 330 which are a modification of the third embodiment.

The first hole 371 formed in the first support plate 341 is formed by a diamond-shaped hole section 371A of a substantially diamond shape of which the longer diagonal line of the pair of diagonal lines is arranged along the horizontal direction, and a pair of horizontal hole sections 371B provided at both ends in the horizontal direction of the diamond-shaped hole section 371A.

On the other hand, the second holes 372 formed in the second support plate 342 have a shape rotated 90 degrees from the first holes 371. In other words, the second hole 372 is formed by a diamond-shaped hole section 372A of a substantially diamond shape of which the longer diagonal line of the pair of diagonal lines is arranged along the vertical direction, and vertical hole sections 372B provided at both ends in the vertical direction of the diamond-shaped hole section 372A.

In a heat exchanger 301A configured in this manner, the tube insertion through-holes 350 formed in the support plates 330 with respect to one heat transfer tube 320 are the first holes 371 in the first support plates 341 and the second holes 372 in the second support plates 342. Accordingly, in adjacent support plates 330, the shapes of the space portions formed between the tube insertion through-holes 350 of the support plates 330 and the heat transfer tubes 320 are different between adjacent first support plate 341 and second support plate 342. Thus, when the out-of-tube fluid R2 passes through the space portions formed between the tube insertion through-holes 350 and the heat transfer tubes 320, the laminar flow is disrupted according to the shape of the space portions. Thus, heat exchange is efficiently performed between the in-tube fluid R1 and the out-of-tube fluid R2 along the entire heat transfer tubes 320 in the longitudinal direction.

Fourth Embodiment

Below, description will be given of a heat exchanger 401 according to the fourth embodiment of the present invention using FIG. 9A, FIG. 9B, FIG. 10A, and FIG. 10B.

In this embodiment, the same reference numerals are given to the same members as the members used in the embodiments described above, and description thereof will be omitted.

In the heat exchanger 401 according to the present embodiment, the configuration of the support plates 30 provided in the heat exchanger 1 according to the first embodiment described above is changed, and the configuration is in other respects the same as that of the heat exchanger 1 according to the first embodiment.

Figure 9A:
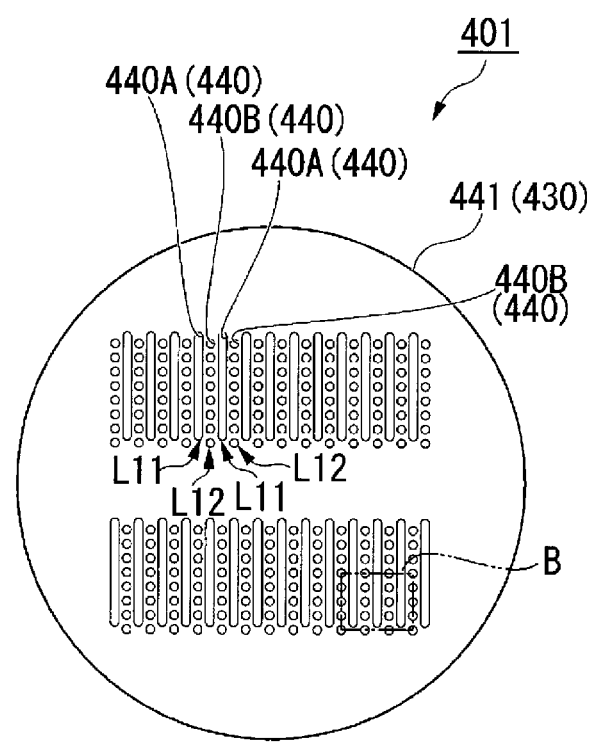
FIG. 9A is a cross-sectional view of one support plate portion constituting a heat exchanger according to a fourth embodiment of the present invention.
Figure 9B:
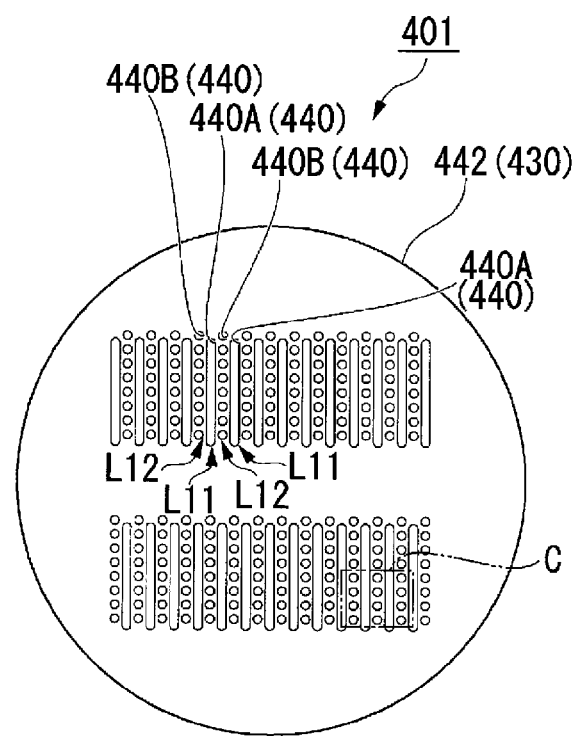
FIG. 9B is a cross-sectional view of a support plate portion adjacent to the one support plate constituting the heat exchanger according to the modification of the fourth embodiment of the present invention.

As illustrated in FIG. 9A and FIG. 9B, vertical holes 440A which are openings of a vertically-elongated shape are bored in a first support plate 441. Tube insertion through-holes 440 are set in the interior of the vertical holes 440A. The row (hereinafter, referred to as a circular hole row L12) next to the row (hereinafter, referred to as a vertical hole row L11) where a plurality of vertical holes 440A are arranged is configured by a plurality of circular holes 440B, of which the openings have a substantially circular shape, being arranged at intervals in the vertical direction as the tube insertion through-holes 440. In this manner, the vertical hole row L11 and the circular hole row L12 are alternately arranged in the horizontal direction.

On the other hand, in a second support plate 442, the vertical hole row L11 and the circular hole row L12 are alternately arranged in the same manner as in the first support plate 441. In addition, the second support plate 442 is arranged to be shifted by one row in the horizontal direction with respect to the first support plate 441.

In this manner, in the first support plate 441 and the second support plate 442, the shapes of the tube insertion through-holes 440 are configured so as to be different from each other with respect to one heat transfer tube 20. In the present embodiment, the heat transfer tubes 20 inserted in the vertical holes 440A constituting the vertical hole row L11 in the first support plate 441 are configured so as to be inserted in the circular holes 440B constituting the circular hole row L12 in the second support plate 442.

Figure 10A:
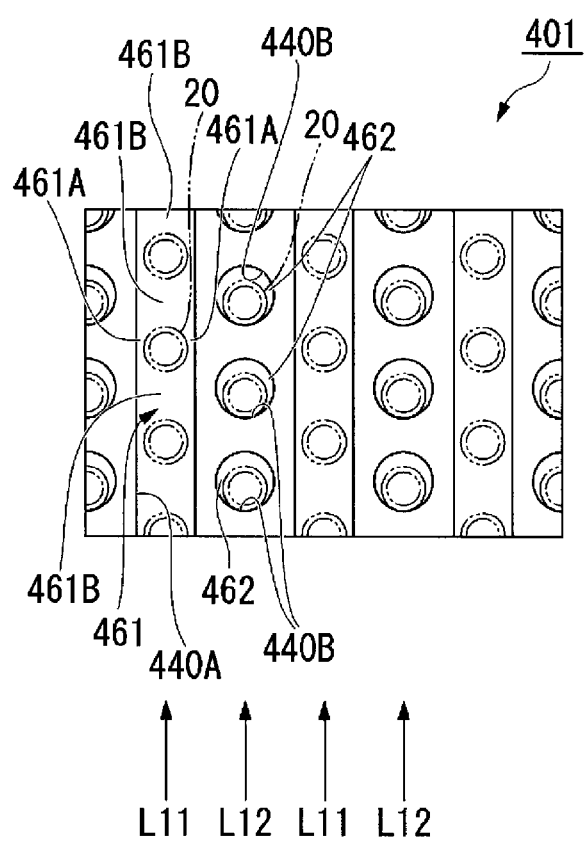
FIG. 10A is a partially enlarged diagram of section B in FIG. 9A.
Figure 10B:
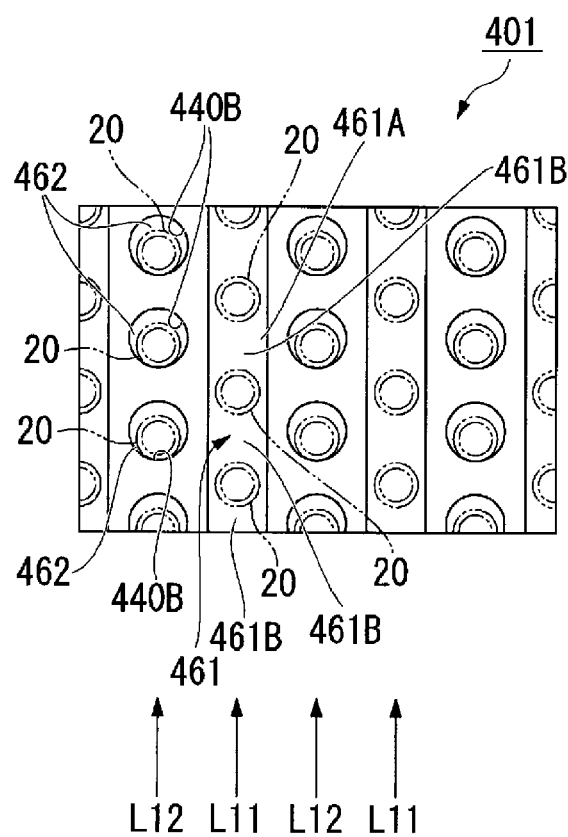
FIG. 10B is a partially enlarged diagram of section C in FIG. 9B.

As illustrated in FIG. 10A and FIG. 10B, in the vertical holes 440A, first space sections 461 are formed between the inserted heat transfer tubes 20 and the vertical holes 440A. The first space section 461 is formed by space sections 461A formed between the hole of a vertically-elongated shape and end sections in the horizontal direction of the heat transfer tubes 20, and space sections 461B formed between adjacent heat transfer tubes 20.

On the other hand, in the circular holes 440B, a lower section of the inner peripheral surface of the circular holes 440B and a lower section of the outer peripheral surface of heat transfer tubes 20 come into contact. A second space section 462 is formed along the outer peripheral surface other than at the lower section of the heat transfer tubes 52.

In the heat exchanger 401 configured in this manner, the shapes of the tube insertion through-holes 440 formed in the support plates 430 with respect to one heat transfer tube 20 are different between adjacent support plates 430. Accordingly, the shapes of the spaces (the first space section 461 and the second space section 462) formed between the tube insertion through-holes 440 of the support plates 430 and the heat transfer tubes 20 are different between adjacent support plates 430. Thus, when the out-of-tube fluid R2 passes through the first space section 461 and second space section 462, the laminar flow is disrupted according to the shapes of the first space section 461 and second space section 462. Thus, since a stirring flow is generated and temperature unevenness is suppressed, heat exchange is efficiently performed between the in-tube fluid R1 and the out-of-tube fluid R2 along the entire heat transfer tubes 20 in the longitudinal direction.

Fifth Embodiment

Figure 11:
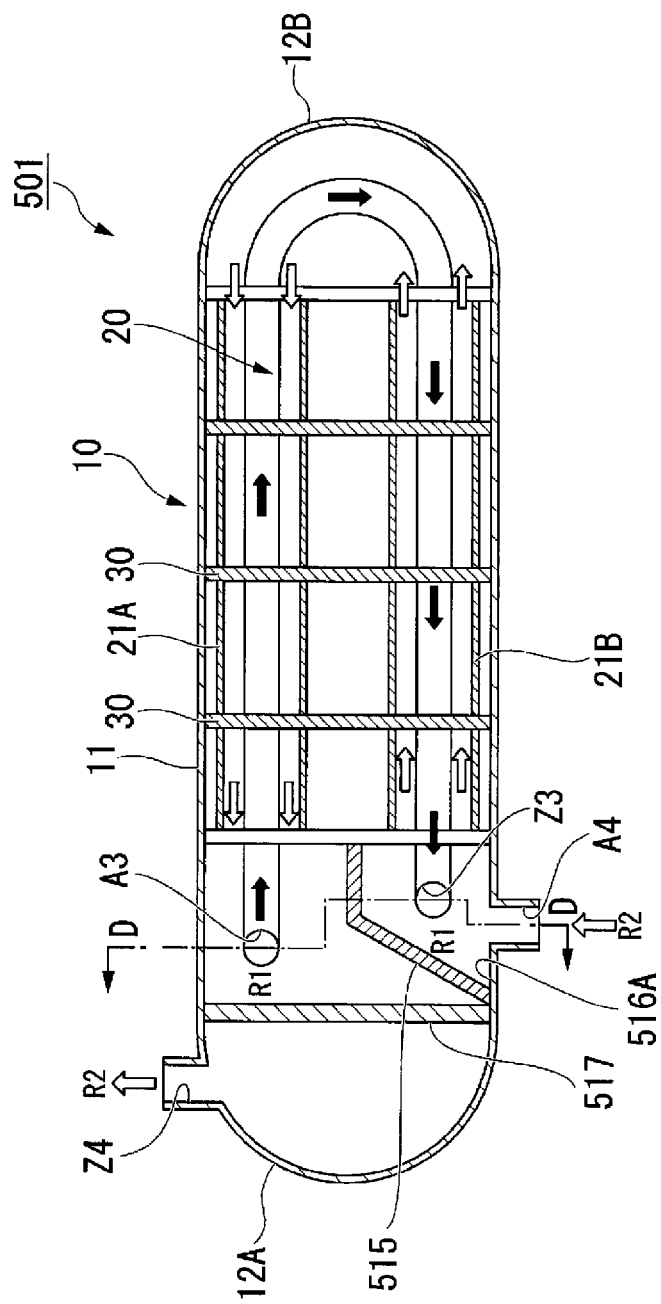
FIG. 11 is an overall configuration diagram illustrating the configuration of a heat exchanger according to a fifth embodiment of the present invention.
Figure 12:
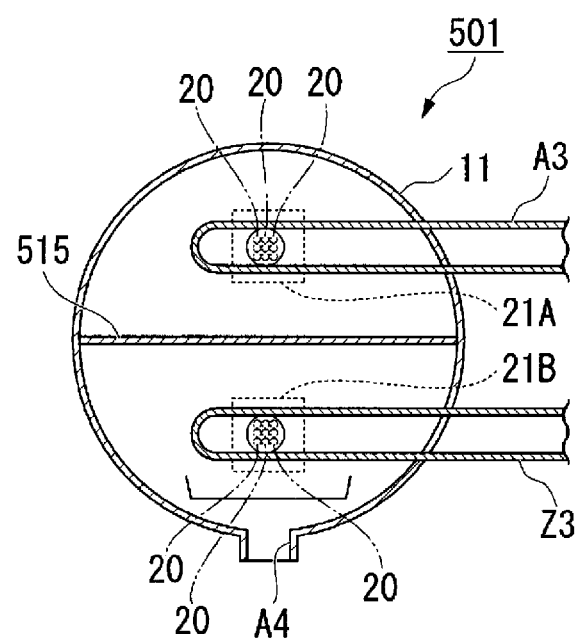
FIG. 12 is a cross-sectional view along D-D in FIG. 11.

Below, description will be given of a heat exchanger 501 according to the fifth embodiment of the present invention using FIG. 11 and FIG. 12.

In this embodiment, the same reference numerals are given to the same members as the members used in the embodiments described above, and description thereof will be omitted.

In the heat exchanger 501 according to the present embodiment, the configuration of the first inlet nozzle A1, the first outlet nozzle Z1, the second inlet nozzle A2, and the second outlet nozzle Z2 in the heat exchanger 1 according to the first embodiment described above is changed. Furthermore, the heat exchanger 501 according to the present embodiment is different from the heat exchanger 1 according to the first embodiment that the tube plate 17 is not provided in the shell 11 of the body 10 and a demister 517 which removes mist is provided. The configuration is in other respects the same as that of the heat exchanger 1 according to the first embodiment.

A first inlet header piping (inlet header piping) A3 supplying the in-tube fluid R1 to the interior of the body 10 is provided at the upper section of the shell 11 of the body 10. In the first inlet header piping A3, a fixing plate (not illustrated) where insertion holes corresponding to the end sections of the plurality of heat transfer tubes 20 are formed is provided. The end sections of the plurality of heat transfer tubes 20 are inserted into and fixed to the fixing plate. The first inlet header piping A3 supplies the in-tube fluid R1 to the plurality of heat transfer tubes 20.

In addition, a first outlet header piping (outlet header piping) Z3 which discharges the in-tube fluid R1 to the outside of the body 10 is provided at the lower section of the shell 11 of the body 10. A fixed plate (not illustrated) where insertion holes corresponding to the end sections of the plurality of heat transfer tubes 20 are formed is provided in the first outlet header piping Z3. The end sections of the plurality of heat transfer tubes 20 are inserted into and fixed to the fixing plate. The first outlet header piping Z3 discharges the heat-exchanged in-tube fluid R1 from the plurality of heat transfer tubes 20.

A second inlet nozzle A4 which supplies the out-of-tube fluid R2 inside the body 10 is provided at the lower section of the shell 11 of the body 10. In addition, a second outlet nozzle Z4 which discharges the out-of-tube fluid R2 to the outside of the body 10 is provided at the upper section of the shell lid 12A of the body 10.

A compartment 516A through which the out-of-tube fluid R2 supplied from the second inlet nozzle A4 passes and a compartment 516B through which the out-of-tube fluid R2 to be discharged from the second outlet nozzle Z4 passes are partitioned by a second partition wall 515.

Description will be given of the operation of the heat exchanger 501 configured in this manner.

The in-tube fluid R1 flows through the inside of the plurality of heat transfer tubes 20 after flowing in from the first inlet header piping A3. Meanwhile, the out-of-tube fluid R2 flows inside the ducts 21A and 21B and outside each of the heat transfer tubes 20 after flowing in from the second inlet nozzle A4 and passing through the compartment 516A.

The direction in which the in-tube fluid R1 flows and the direction in which the out-of-tube fluid R2 flows are opposite directions. It is possible for the in-tube fluid R1 and the out-of-tube fluid R2 to exchange heat through the tube walls of the heat transfer tubes 20. By this heat exchange, the temperature of the out-of-tube fluid R2 is increased and the temperature of the in-tube fluid R1 is decreased, and the out-of-tube fluid R2 and the in-tube fluid R1 are discharged from the second outlet nozzle Z4 and the first outlet header piping Z3, respectively.

In the heat exchanger 501 configured in this manner, when the out-of-tube fluid R2 passes through the spaces 43A and 43B, in the same manner as in the heat exchanger 1 of the first embodiment, the laminar flow is disrupted according to the shapes of the spaces 43A and 43B. Thus, heat exchange is efficiently performed between the in-tube fluid R1 and the out-of-tube fluid R2 along the entire heat transfer tubes 20 in the longitudinal direction.

In addition, even in an exceptional case where the in-tube fluid R1 leaks from the heat transfer tubes 20, it is possible for the demister 517, which is provided between the shell lid 12A where the second outlet nozzle Z4 is provided and the shell 11, to absorb the leaked in-tube fluid R1. Thus, since the in-tube fluid R1 does not flow into the shell lid 12A, there is no possibility that the operation of the device or the like provided in the shell lid 12A will be influenced.

In addition, in the first embodiment, the thickness of the tube plate 17 for fixing the heat transfer tubes 20 is determined according to the conditions such as the temperature and pressure inside the body 10, the inner diameter of the body 10, and the like. In a case where it is necessary to increase the thickness of the tube plate 17 according to these conditions, it is possible to suppress the costs by employing the heat exchanger 501 of the present embodiment since the heat transfer tubes 20 in the present embodiment are configured to be fixed to the fixing plate provided in the first inlet header piping A3 and the first outlet header piping Z3 and it is not necessary to provide the tube plate 17.

Sixth Embodiment

Figure 13:
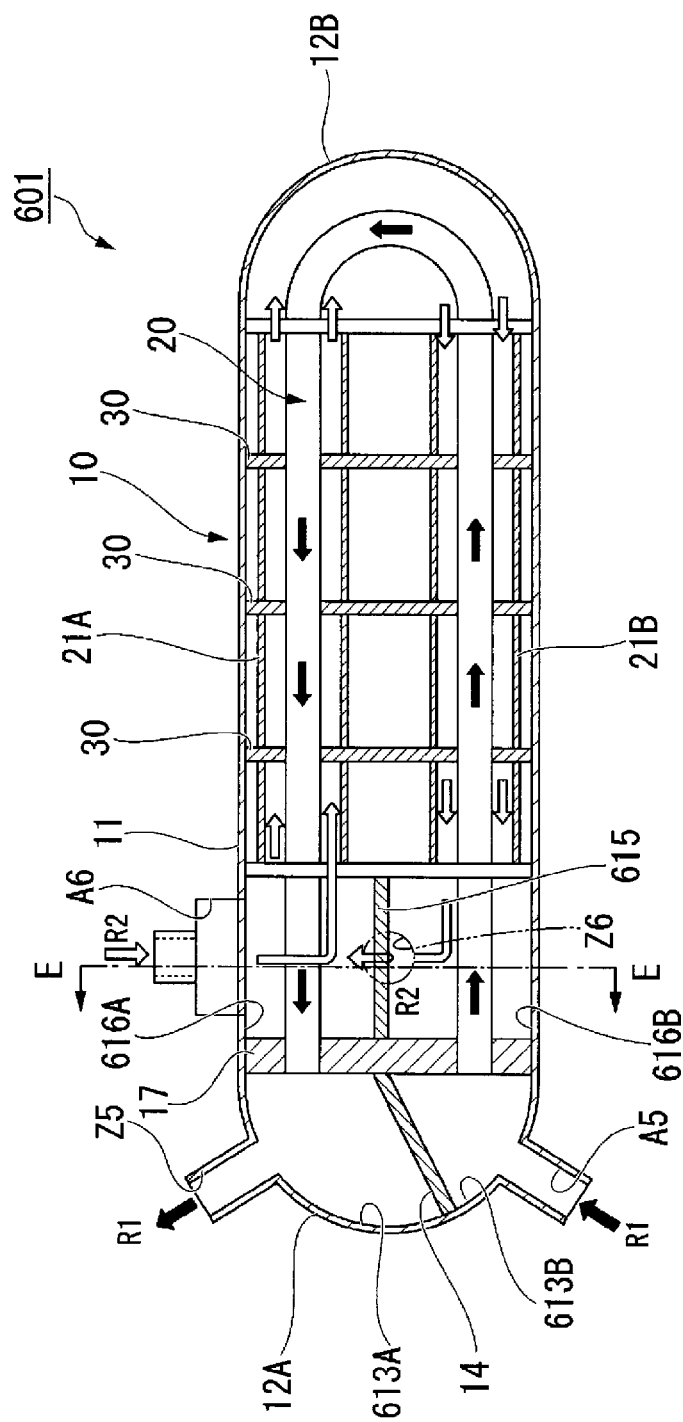
FIG. 13 is an overall configuration diagram illustrating the configuration of a heat exchanger according to a sixth embodiment of the present invention.
Figure 14:
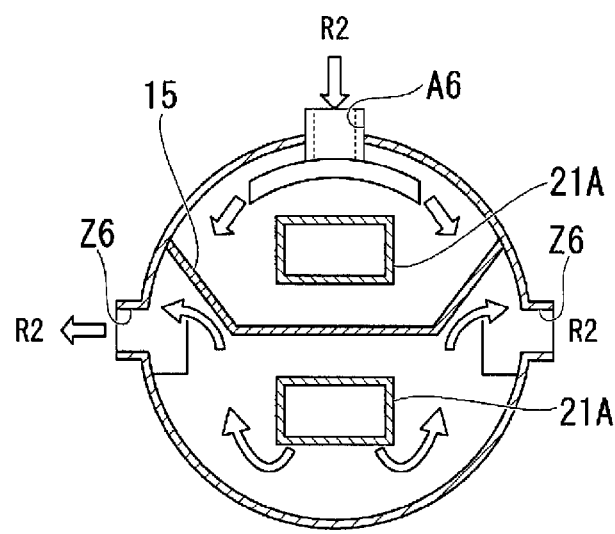
FIG. 14 is a cross-sectional view along E-E in FIG. 13.

Below, description will be given of a heat exchanger 601 according to the sixth embodiment of the present invention using FIG. 13 and FIG. 14.

In this embodiment, the same reference numerals are given to the same members as the members used in the embodiments described above, and description thereof will be omitted.

The heat exchanger 601 according to the present embodiment is the heat exchanger 1 according to the first embodiment described above, in which the configuration of the first inlet nozzle A1, the first outlet nozzle Z1, the second inlet nozzle A2, and the second outlet nozzle Z2 is changed. The configuration is in other respects the same as that of the heat exchanger 1 according to the first embodiment.

A first inlet nozzle A5 supplying the in-tube fluid R1 inside the body 10 is provided at the lower section of the shell lid 12A of the body 10. In addition, a first outlet nozzle Z5 which discharges the in-tube fluid R1 outside the body 10 is provided at the upper section of the shell lid 12A of the body 10.

In the shell lid 12A, a compartment 613B through which the in-tube fluid R1 supplied from the first inlet nozzle A5 passes and a compartment 613A through which the in-tube fluid R1 to be discharged from the first outlet nozzle Z5 passes are partitioned by the first partition wall 14.

In addition, a second inlet nozzle A6 supplying the out-of-tube fluid R2 inside the body 10 is provided at the upper section of the shell 11 of the body 10. In addition, a pair of second outlet nozzles Z6 discharging the out-of-tube fluid R2 to the outside of the body 10 are provided in a substantially central section of the shell 11 of the body 10 in the vertical direction. The second inlet nozzle A6 is provided in the shell 11 of the body 10 via a thermal shield structure (not illustrated).

In the shell 11, a compartment 616A through which the out-of-tube fluid R2 supplied from the second inlet nozzle A6 passes and a compartment 616B through which the out-of-tube fluid R2 to be discharged from the second outlet nozzle Z6 passes are partitioned by a second partition wall 615.

Description will be given of the operation of the heat exchanger 601 configured in this manner.

The in-tube fluid R1 flows through the inside of the plurality of heat transfer tubes 20 after flowing in from the first inlet nozzle A5 and passing through the compartment 613B. Meanwhile, the out-of-tube fluid R2 flows through the inside of the ducts 21A and 21B and the outside of each of the heat transfer tubes 20 after flowing in from the second inlet nozzle A6 and passing through the compartment 616A.

The direction in which the in-tube fluid R1 flows and the direction in which the out-of-tube fluid R2 flows are opposite directions. It is possible for the in-tube fluid R1 and the out-of-tube fluid R2 to exchange heat through the tube walls of the heat transfer tubes 20. Due to this heat exchange, the out-of-tube fluid R2 is decreased in temperature and discharged from the second outlet nozzle Z6 provided below the second inlet nozzle A6, and the in-tube fluid R1 is increased in temperature and discharged from the first outlet nozzle Z5 provided above the first inlet nozzle A5.

In the heat exchanger 601 configured in this manner, in the same manner as in the heat exchanger 1 of the first embodiment, when the out-of-tube fluid R2 passes through the spaces 43A and 43B, the laminar flow is disrupted according to the shapes of the spaces 43A and 43B. Thus, heat exchange is efficiently performed between the in-tube fluid R1 and the out-of-tube fluid R2 along the entire heat transfer tubes 20 in the longitudinal direction.

Modification of Sixth Embodiment

Figure 15:
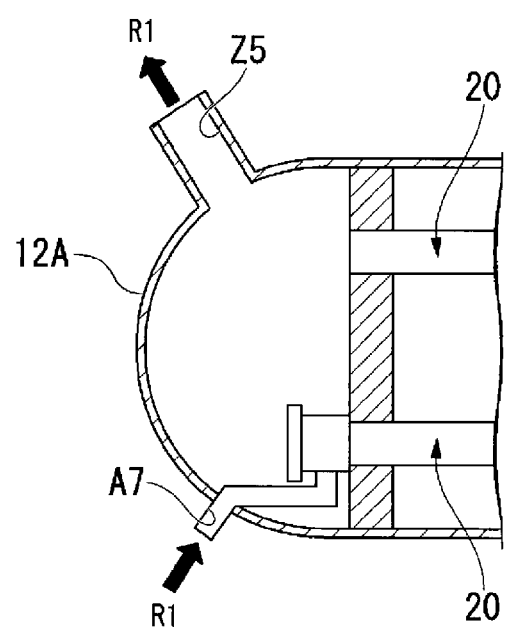
FIG. 15 is a diagram illustrating the configuration of an end section of a body of a heat exchanger according to a modification of the sixth embodiment of the present invention.

As a modification of the sixth embodiment, as illustrated in FIG. 15, the configuration may be such that a header piping (inlet header piping) A7 is provided in the shell lid 12A of the plurality of heat transfer tubes 20 and the in-tube fluid R1 is supplied from the header piping A7 to the interior of the plurality of heat transfer tubes 20.

In such a case, since it is not necessary to provide the first partition wall 14 in order to partition the compartments 613A and 613B through which the in-tube fluid R1 passes as in the sixth embodiment, it is possible to suppress the costs and simplify the configuration.

Seventh Embodiment

As the seventh embodiment of the present invention, description will be given of a gas turbine plant 50 provided with the heat exchanger 1 configured as described above using FIG. 16. In this embodiment, the same reference numerals are given to the same members as the members used in the embodiments described above, and description thereof will be omitted.

Figure 16:
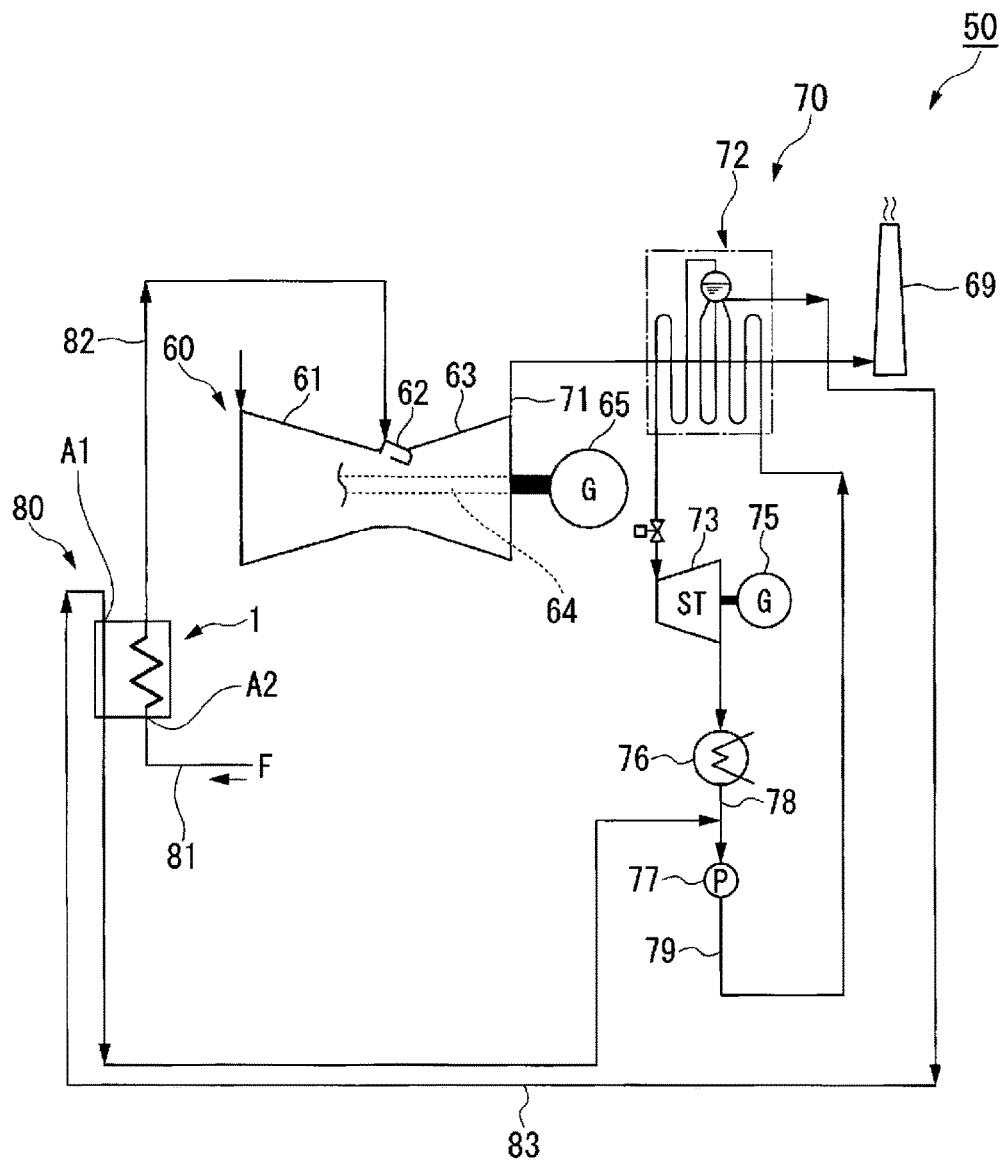
FIG. 16 is a system diagram of a gas turbine according to a seventh embodiment of the present invention.

As illustrated in FIG. 16, the gas turbine plant 50 is provided with a gas turbine 60, an exhaust heat recovery apparatus 70, and a fuel supply system 80. The exhaust heat recovery apparatus 70 recovers heat from the combustion gas discharged from the gas turbine 60. The fuel supply system 80 supplies fuel F to the gas turbine 60.

The gas turbine 60 has an air compressor 61, a combustor 62, and a turbine 63. The air compressor 61 generates compressed air by compressing ambient air. The combustor 62 generates combustion gas by combusting the fuel F in the compressed air. The turbine 63 is driven by high-temperature and high-pressure combustion gas. For example, a generator 65 generating electricity by the rotation of a turbine rotor 64 is connected with the turbine 63.

The exhaust heat recovery apparatus 70 has an exhaust line 71, a chimney 69, a heat recovery steam generator 72, and a steam turbine 73. The exhaust line 71 is connected with a combustion gas exhaust port of the turbine 63. The chimney 69 is provided at an end section of the exhaust line 71. The heat recovery steam generator 72 generates steam by carrying out heat exchange between the exhaust gas passing through the exhaust line 71 and water. The steam turbine 73 is driven by steam generated by the heat recovery steam generator 72.

For example, a generator 75 which generates electricity by the rotation of a rotor is connected with the steam turbine 73.

Furthermore, the exhaust heat recovery apparatus 70 has a condenser 76, and a water supply pump 77. The condenser 76 changes the steam which drove the steam turbine 73 back to water. The water supply pump 77 returns the water in the condenser 76 to the heat recovery steam generator 72.

The condenser 76 and the water supply pump 77 are connected by a condensate line 78. In addition, the water supply pump 77 and the heat recovery steam generator 72 are connected by a water supply line 79.

The fuel supply system 80 has a fuel line 81, the heat exchanger 1, a preheated fuel line 82, and a heated water line 83. The fuel F from the fuel supply source flows in the fuel line 81. The heat exchanger 1 is connected with the fuel line 81 and preheats the fuel F. The preheated fuel line 82 introduces the fuel F preheated by the heat exchanger 1 to the combustor 62. The heated water line 83 introduces water heated by the heat recovery steam generator 72 to the heat exchanger 1.

The heat exchanger 1 heats the fuel F by carrying out heat exchange between the water heated by the heat recovery steam generator 72 and the fuel F.

Here, the heated water line 83 is connected with the first inlet nozzle A1 of the heat exchanger 1. Thus, the water heated by the heat recovery steam generator 72 is supplied from the first inlet nozzle A1 to the heat exchanger 1 as the in-tube fluid R1. In addition, the fuel line 81 is connected with the second inlet nozzle A2 of the heat exchanger 1. Thus, the fuel F is supplied from the second inlet nozzle A2 to the heat exchanger 1 as the out-of-tube fluid R2 (fluid to be heated).

In the gas turbine plant 50 configured in this manner, it is possible to heat the fuel F to a higher temperature in the heat exchanger 1 by carrying out heat exchange between the water heated by the heat recovery steam generator 72 and the fuel F and introduce the fuel F to the combustor 62. Therefore, since it is possible for the combustor 62 to efficiently generate combustion gas by combusting the heated fuel F in compressed air, it is possible to increase the heat efficiency of the gas turbine plant 50.

Eighth Embodiment

Next, description will be given of a gas turbine plant 150 provided with the heat exchanger 601 according to the eighth embodiment using FIG. 17. In this embodiment, the same reference numerals are given to the same members as the members used in the embodiments described above, and description thereof will be omitted.

The gas turbine plant 150 according to the present embodiment is provided with the heat exchanger 601 as a part of a cooling system 86 which cools high-temperature sections in the gas turbine 60 according to the seventh embodiment described above, and the configuration is in other respects the same as that of the gas turbine plant 50 according to the seventh embodiment.

Figure 17:
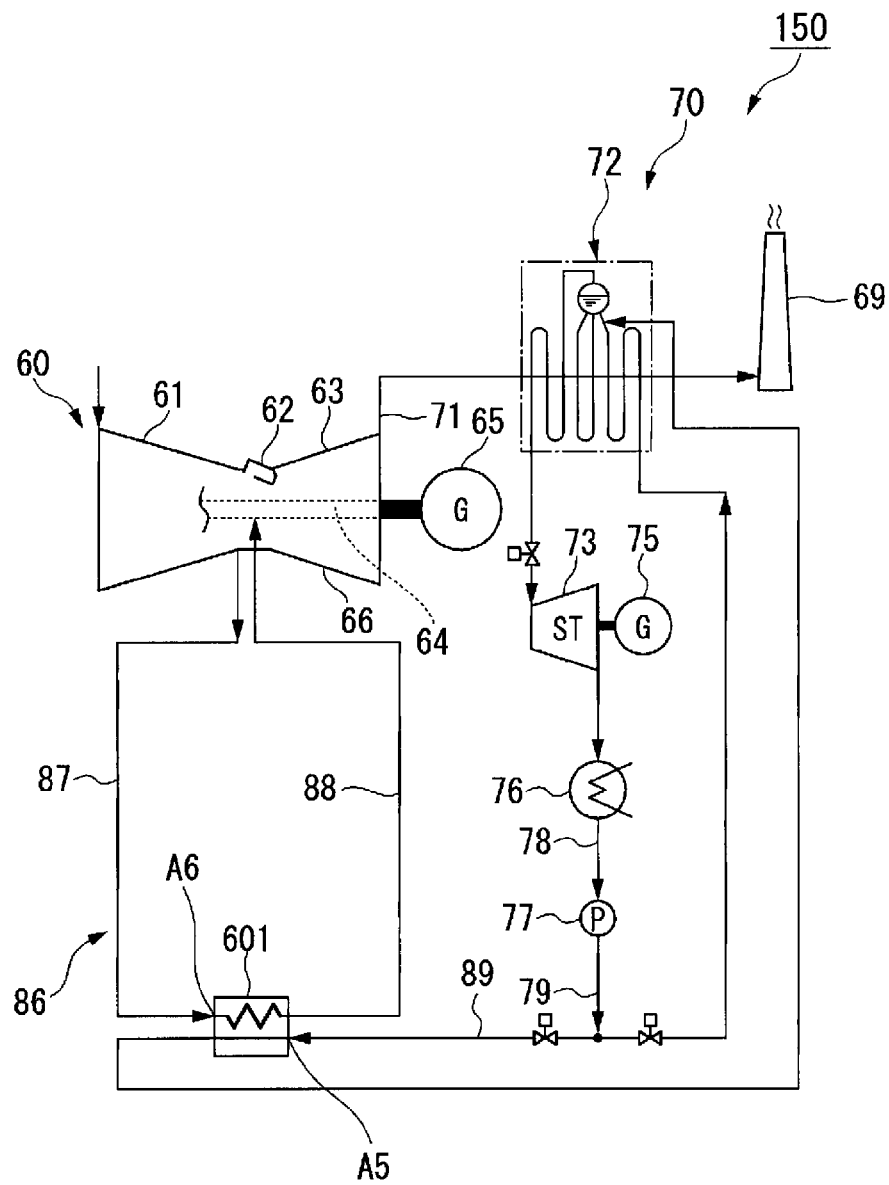
FIG. 17 is a system diagram of a gas turbine according to an eighth embodiment of the present invention.

As illustrated in FIG. 17, the turbine 63 has a casing 66 covering the turbine rotor 64.

The turbine rotor 64 is not illustrated in detail; however, the turbine rotor 64 has a rotor main body rotating around a rotational central axis, and a plurality of blades fixed to the outer periphery of the rotor main body. A cooling air flow path through which cooling air for cooling the blades passes is formed inside the rotor main body and inside the blades.

The cooling system 86 has a compressed air line 87, the heat exchanger 601, a cooling air line 88, and a cooling water line 89. The compressed air line 87 introduces compressed air (extracted air) extracted from the air compressor 61 of the gas turbine 60 to the heat exchanger 601. The heat exchanger 601 is connected with the compressed air line 87 and cools the compressed air. The cooling air line 88 introduces cooling air, which is the compressed air cooled by the heat exchanger 601, to the turbine rotor 64. The cooling water line 89 introduces water in the water supply line 79 of the exhaust heat recovery apparatus 70 to the heat exchanger 601.

The heat exchanger 601 cools compressed air by carrying out heat exchange between the compressed air extracted from the air compressor 61 and water discharged from the condenser 76 of the exhaust heat recovery apparatus 70.

Here, the cooling water line 89 is connected to the first inlet nozzle A5 of the heat exchanger 601. Thus, the water discharged from the condenser 76 is supplied from the first inlet nozzle A5 to the heat exchanger 601 as the in-tube fluid R1. In addition, the compressed air line 87 is connected with the second inlet nozzle A6 of the heat exchanger 601. Thus, the compressed air (fluid to be cooled and fluid for cooling) is supplied from the second inlet nozzle A6 to the heat exchanger 601 as the out-of-tube fluid R2.

In the gas turbine plant 150 configured in this manner, it is possible to introduce the compressed air cooled to a lower temperature to the turbine rotor 64 via the cooling air line 88 by carrying out heat exchange between the water discharged from the condenser 76 and the compressed air extracted from the air compressor 61 in the heat exchanger 601. Thus, it is possible to cool the blades by introducing the cooled cooling air into the cooling air flow path inside the blades.

The various shapes, combinations, and the like of the constituent members illustrated in the embodiments described above are examples and various changes thereto are possible based on design requirements within a range which does not depart from the gist of the present invention.

For example, the heat exchangers according to the first embodiment and the fifth embodiment are configured to decrease the temperature of the in-tube fluid R1 and increase the temperature of the out-of-tube fluid R2 by carrying out heat exchange between the in-tube fluid R1 and the out-of-tube fluid R2. On the other hand, the heat exchanger according to the sixth embodiment is configured to increase the temperature of the in-tube fluid R1 and decrease the temperature of the out-of-tube fluid R2 by carrying out heat exchange between the in-tube fluid R1 and the out-of-tube fluid R2. By reversing the above, the heat exchangers according to the first embodiment and the fifth embodiment may have a configuration where the temperature of the in-tube fluid R1 is increased and the temperature of the out-of-tube fluid R2 is decreased. In addition, the heat exchanger according to the sixth embodiment may have a configuration where the temperature of the in-tube fluid R1 is decreased and the temperature of the out-of-tube fluid R2 is increased.

In addition, in the case of the configuration where the temperature of the in-tube fluid R1 is increased and the temperature of the out-of-tube fluid R2 is decreased by heat exchange, in the seventh embodiment, the first inlet nozzle A1 of the heat exchanger 1 may be connected with the fuel line 81 and the second inlet nozzle A2 may be connected with the heated water line 83. Thus, water heated by the heat recovery steam generator 72 is supplied from the second inlet nozzle A2 to the heat exchanger 1 as the out-of-tube fluid R2. In addition, the fuel F from the fuel line 81 connected with the first inlet nozzle A1 of the heat exchanger 1 is supplied to the heat exchanger 1 as the in-tube fluid R1.

In the gas turbine plant configured in this manner, it is possible to heat the fuel F to a higher temperature by carrying out heat exchange between the water heated in the heat recovery steam generator 72 and the fuel F in the heat exchanger 1 and introduce the fuel F to the combustor 62. Therefore, since it is possible for the combustor 62 to efficiently generate combustion gas by combusting the heated fuel F in the compressed air, it is possible to increase the heat efficiency of the gas turbine plant 50.

In addition, in the case of the configuration where the temperature of the in-tube fluid R1 is decreased and the temperature of the out-of-tube fluid R2 is increased by heat exchange, in the eighth embodiment, the compressed air line 87 may be connected with the first inlet nozzle A5 of the heat exchanger 601 and the cooling water line 89 may be connected with the second inlet nozzle A6. Thus, the compressed air extracted from the compressed air line 87 is supplied from the first inlet nozzle A5 to the heat exchanger 601 as the in-tube fluid R1. In addition, the water from the cooling water line 89 is supplied to the heat exchanger 601 as the out-of-tube fluid R2.

In the gas turbine plant configured in this manner, it is possible to introduce the cooled compressed air to the turbine rotor 64 via the cooling air line 88 after carrying out heat exchange between the water discharged from the condenser 76 and the compressed air extracted from the air compressor 61 in the heat exchanger 601.

Thus, it is possible to cool the blades by introducing the cooled cooling air into the cooling air flow path inside the blades.

In addition, it is also possible to apply the configuration of the support plates and the heat transfer tubes constituting the heat exchangers according to the second embodiment to the fourth embodiment to the heat exchangers according to the fifth embodiment and the sixth embodiment.

INDUSTRIAL APPLICABILITY

According to the heat exchanger described above and the gas turbine plant provided therewith, it is possible to efficiently carry out heat exchange.

REFERENCE SIGNS LIST

1 Heat exchanger
10 Body
20 Heat transfer tube
21A, 21B Duct
30 Support plate
40 Tube insertion through-hole
50 Gas turbine plant
61 Air compressor
62 Combustor
63 Turbine
72 Heat recovery steam generator
73 Steam turbine
76 Condenser
A3 First inlet header piping (inlet header piping)
A7 Header piping (inlet header piping)
Z3 First outlet header piping (outlet header piping)

The invention claimed is:

1. A heat exchanger comprising:
   a body having a cylindrical shell and a first shell lid and a second shell lid that cover both ends of the shell;
   a plurality of heat transfer tubes provided inside the body;
   a plurality of support plates provided at intervals along a longitudinal direction of the heat transfer tubes, each of the support plates being provided with a plurality of tube insertion through-holes for inserting the plurality of heat transfer tubes;
   a tube plate provided between an interior volume defined by the cylindrical shell and an interior volume of the first shell lid;
   a partition wall partitioning the interior volume of the first shell lid into a first compartment and a second compartment;
   a first inlet nozzle provided on a first section of the first shell lid, and configured to supply an in-tube fluid to the first compartment; and
   a first outlet nozzle provided on a second section of the first shell lid, and configured to discharge the in-tube fluid to the outside of the body via the second compartment,
   wherein an inlet section of each of the heat transfer tubes is fixed to the tube plate and is opened into the first compartment, and an outlet section of each of the heat transfer tubes is fixed to the tube plate and is opened into the second compartment, and
   wherein each of the heat transfer tubes extends in a straight line from the inlet section of the corresponding heat transfer tube toward the second shell lid, is curved in a U shape in the second shell lid, and then extends in a straight line to the outlet section so as to be directed toward the first shell lid, wherein the heat exchanger further comprises:

a plurality of ducts provided inside the body, each of the ducts being provided on an outer peripheral side of a bundle of the plurality of heat transfer tubes in which the in-tube fluid flows in a single direction, wherein each of the plurality of ducts covers the plurality of heat transfer tubes and an out-of-tube fluid flowing outside the plurality of heat transfer tubes, an outer peripheral surface of each of the plurality of ducts is spaced from an inner peripheral surface of the body, each of the plurality of ducts extends in the longitudinal direction from a first end spaced from the tube plate to a second end at a U-shaped curved portion of the heat transfer tubes, two of the ducts, which are adjacent to each other, are provided at a distance from each other, and shapes of two of the tube insertion through-holes of two longitudinally adjacent support plates of the plurality of support plates are different, wherein one of the heat transfer tubes is inserted into the two insertion through-holes.

2. The heat exchanger according to claim 1, further comprising fins provided on the outer peripheral surface of the heat transfer tubes, the fins protruding outward in a radial direction and extending in the longitudinal direction.

3. A gas turbine plant comprising:
the heat exchanger according to claim 1;
an air compressor generating compressed air by compressing ambient air;
a combustor generating combustion gas by combusting fuel in compressed air; and
a turbine driven by high-temperature and high-pressure combustion gas,
the fuel to be supplied to the combustor being supplied to the heat exchanger as a fluid to be heated.

4. The gas turbine plant according to claim 3, further comprising
a heat recovery steam generator generating steam by carrying out heat exchange between combustion gas discharged from the turbine and water,
the in-tube fluid flowing inside the heat transfer tubes,
the out-of-tube fluid flowing outside the heat transfer tubes and inside the body, the in-tube fluid being a fluid derived from the heat recovery steam generator, and
the out-of-tube fluid, which is the fuel to be supplied to the heat exchanger, being heat-exchanged with the in-tube fluid, increased in temperature, and supplied to the combustor.

5. The gas turbine plant according to claim 3, further comprising
a heat recovery steam generator generating steam by carrying out heat exchange between the combustion gas discharged from the turbine and water,
the in-tube fluid flowing inside the heat transfer tubes,
the out-of-tube fluid flowing outside the heat transfer tubes and inside the body,
the out-of-tube fluid being a fluid derived from the heat recovery steam generator, and
the in-tube fluid, which is the fuel to be supplied to the heat exchanger, being heat-exchanged with the out-of-tube fluid, increased in temperature, and supplied to the combustor.

6. A gas turbine plant comprising:
the heat exchanger according to claim 1;
an air compressor generating compressed air by compressing ambient air;
a combustor generating combustion gas by combusting fuel in compressed air; and
a turbine driven by high-temperature and high-pressure combustion gas,
a fluid for cooling to be supplied to the turbine being supplied to the heat exchanger as a fluid to be cooled.

7. The gas turbine plant according to claim 6, further comprising:
a heat recovery steam generator generating steam by carrying out heat exchange between the combustion gas discharged from the turbine and water;
a steam turbine driven by steam generated by the heat recovery steam generator; and
a condenser for changing the steam which drove the steam turbine back to water,
the in-tube fluid flowing inside the heat transfer tubes,
the out-of-tube fluid flowing outside the heat transfer tubes and inside the body,
the in-tube fluid being a fluid derived from the condenser, and
the out-of-tube fluid, which is extracted air extracted from the air compressor, being heat-exchanged with the in-tube fluid, decreased in temperature, and supplied to the turbine.

8. The gas turbine plant according to claim 6, further comprising:
a heat recovery steam generator generating steam by carrying out heat exchange between the combustion gas discharged from the turbine and water;
a steam turbine driven by steam generated by the heat recovery steam generator; and
a condenser for changing the steam which drove the steam turbine back to water,
the in-tube fluid flowing inside the heat transfer tubes,
the out-of-tube fluid flowing outside the heat transfer tubes and inside the body,
the out-of-tube fluid being a fluid derived from the condenser, and
the in-tube fluid, which is extracted air extracted from the air compressor, being heat-exchanged with the out-of-tube fluid, decreased in temperature, and supplied to the turbine.

9. The heat exchanger according to claim 1, further comprising:
an upper plate having a plurality of upper convex sections; and
a lower plate having a plurality of lower convex sections, the upper and lower plates being provided inside the plurality of ducts,
wherein the upper plate and the lower plate are separated in a direction orthogonal to the longitudinal direction, and
wherein the plurality of heat transfer tubes are arranged in a staggered manner such that the plurality of heat transfer tubes are arranged in portions offset relative to the upper and lower convex sections in the orthogonal direction where at least one of the plurality of upper and lower convex sections is provided between at least two heat transfer tubes of the plurality of heat transfer tubes.

10. The heat exchanger according to claim 1, wherein:
the plurality of tube insertion through-holes of each of the support plates includes first tube insertion through-holes and second insertion through-holes, the second insertion through-holes having a different shape from the first tube insertion through-holes;

the first tube insertion through-holes are a plurality of circular holes having a circular shape and are bored at intervals so as to be a circular hole row; and the second insertion through-holes are a plurality of oval holes having an oblong elliptical shape and are bored at intervals at positions shifted with respect to the circular hole row.

* * * * *